United States Patent
Mashino et al.

(10) Patent No.: US 8,798,024 B2
(45) Date of Patent: Aug. 5, 2014

(54) CONTROL STATION DEVICE, TRANSMITTING STATION DEVICE, COMMUNICATION METHOD, AND COMMUNICATION SYSTEM

(75) Inventors: Jun Mashino, Yokosuka (JP); Takatoshi Sugiyama, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 283 days.

(21) Appl. No.: 13/128,206

(22) PCT Filed: Dec. 3, 2009

(86) PCT No.: PCT/JP2009/006594
§ 371 (c)(1),
(2), (4) Date: May 6, 2011

(87) PCT Pub. No.: WO2010/064438
PCT Pub. Date: Jun. 10, 2010

(65) Prior Publication Data
US 2011/0211646 A1 Sep. 1, 2011

(30) Foreign Application Priority Data

Dec. 4, 2008 (JP) ................................. 2008-309815
Dec. 18, 2008 (JP) ................................. 2008-322865

(51) Int. Cl.
*H04J 1/00* (2006.01)
*H04K 1/10* (2006.01)
*H04B 1/00* (2006.01)

(52) U.S. Cl.
USPC .......................... 370/343; 375/260; 455/63.1

(58) Field of Classification Search
None
See application file for complete search history.

(56) References Cited

U.S. PATENT DOCUMENTS

| | | | |
|---|---|---|---|
| 7,620,018 B2 * | 11/2009 | Tee et al. ....................... | 370/332 |
| 7,796,698 B2 * | 9/2010 | Koorapaty et al. ........... | 375/260 |
| 7,801,489 B2 * | 9/2010 | Keller ........................ | 455/67.11 |
| 7,929,623 B2 * | 4/2011 | Hassan et al. ................. | 375/260 |
| 8,331,482 B2 * | 12/2012 | Wang et al. ................... | 375/295 |
| 8,374,130 B2 * | 2/2013 | Hassan et al. ................. | 370/329 |

(Continued)

FOREIGN PATENT DOCUMENTS

| | | |
|---|---|---|
| EP | 1 551 121 A1 | 7/2005 |
| JP | 2008-017074 | 1/2008 |

(Continued)

OTHER PUBLICATIONS

Non-Final Rejection, Korean Patent Application No. 10-2011-7011742, Aug. 27, 2012.

(Continued)

*Primary Examiner* — Hassan Phillips
*Assistant Examiner* — Hicham Foud
(74) *Attorney, Agent, or Firm* — Harness, Dickey & Pierce, P.L.C.

(57) ABSTRACT

In a communication system configured by a transmitting station device and a receiving station device for transmitting and receiving a multicarrier signal using a spectrum including a plurality of subcarriers, a superposed rate which is a rate in which a superposed band in which interference is occurring is used in a used frequency band used for transmitting the multicarrier signal is set so as to increase frequency utilization efficiency of the used frequency band, and the multicarrier signal is transmitted using a spectrum allocated in accordance with the set superposed rate.

25 Claims, 27 Drawing Sheets

(56) References Cited

U.S. PATENT DOCUMENTS

| | | |
|---|---|---|
| 2003/0123425 A1 | 7/2003 | Walton et al. |
| 2006/0171354 A1 | 8/2006 | Tee et al. |
| 2007/0104164 A1 | 5/2007 | Laroia et al. |
| 2008/0008229 A1 | 1/2008 | Hamabe et al. |
| 2008/0031205 A1* | 2/2008 | Kahola et al. ............ 370/338 |
| 2008/0057869 A1 | 3/2008 | Strong et al. |
| 2008/0240032 A1* | 10/2008 | Gelbman et al. ............ 370/329 |
| 2008/0298524 A1* | 12/2008 | Koorapaty et al. ........... 375/348 |
| 2009/0061780 A1* | 3/2009 | Sekiya et al. ............... 455/63.1 |
| 2009/0103486 A1* | 4/2009 | Hunukumbure et al. ..... 370/329 |

FOREIGN PATENT DOCUMENTS

| | | |
|---|---|---|
| KR | 10-2006-0060452 A | 6/2006 |
| WO | WO-2007/047503 | 4/2007 |
| WO | WO-2008/126602 | 10/2008 |

OTHER PUBLICATIONS

T. Yakota et al., "A Study on High Speed Wireless LAN System Employing Superposed Transmission Scheme", The Institute of Electronics, Information and Communication Engineers, Technical Report of IEICE RCS, vol. 99, No. 355, pp. 121-126, Oct. 1999.

J. Mashino et al., "A Study on Subcarrier Overlapping for OFDMA Wireless Systems", Proceedings of the 2008 IEICE General Conference, The Institute of electronics, Information and Communication Engineers, B-5-130, p. 516, Mar. 2008.

H. Kobayashi, "Fundamental and Applied Technology of OFDM Communication Scheme", Triceps Co., 2004, pp. 113-130.

* cited by examiner

CONTROL STATION DEVICE, TRANSMITTING STATION DEVICE, COMMUNICATION METHOD, AND COMMUNICATION SYSTEM

CROSS-REFERENCE TO RELATED APPLICATIONS

This application is a 371 U.S. National Stage of International Application No. PCT/JP2009/006594, filed Dec. 3, 2009. This application claims priority to Japanese Patent Application No. 2008-309815, filed Dec. 4, 2008, and Japanese Patent Application No. 2008-322865, filed Dec. 18, 2008. The disclosures of the above applications are incorporated herein by reference.

TECHNICAL FIELD

The present invention relates to communication using a multicarrier signal, and more particularly, to a control station device, a transmitting station device, a communication method, and a communication system for use in a multicarrier communication scheme to which an error correction code is applied.

BACKGROUND ART

In view of a problem that frequency resource depletion has recently been intensified in wireless communication fields, shared-frequency wireless communication is desired. FIG. 27 is a conceptual diagram showing the entirety of two wireless local area network (LAN) systems with different frequency channels, as an example of a combination of wireless communication systems sharing a frequency band.

In the figure, the wireless communication systems are provided with wireless LAN base stations 2a and 2b, and a receiver 1a. The wireless LAN base station 2a performs communications using a frequency band of CH1 having a center frequency fa. On the other hand, the wireless LAN base station 2b performs communications using a frequency band of CH5 having a center frequency fb (where fa<fb).

In this case, the receiver 1a is arranged at a position at which radio signals of both the wireless LAN base station 2a and the wireless LAN base station 2b arrive, and receives a signal in which two radio signals including a radio signal having the center frequency fa and a radio signal having the center frequency fb partially interfere with each other.

In this way, when the receiver 1a communicates with the wireless LAN base station 2a serving as its communication target, it is essential for the receiver 1a to accurately receive a desired wave even in shared-frequency wireless communication in which a transmission frequency band of the desired wave having the center frequency fa partially overlaps a transmission frequency band of an interference wave having the center frequency fb from the wireless LAN base station 2b.

It is noted that as another example of sharing a frequency band, there is a case in which frequencies are shared between systems with different communication schemes such as combinations of a wireless LAN system, Bluetooth (registered trademark), and WiMAX (registered trademark).

For example, it is assumed that the receiver 1a shown in FIG. 27 communicates with the wireless LAN base station 2a serving as the communication target. In this case, the transmission frequency band of the desired wave having the center frequency fa from the wireless LAN base station 2a partially overlaps the transmission frequency band of the interference wave having the center frequency fb from the wireless LAN base station 2b. In such a shared-frequency wireless communication system, it is essential for the receiver 1a to accurately receive the desired wave.

In order to effectively utilize such frequencies, technology has been reported which improves the frequency utilization efficiency of all signals to be transferred in a plurality of communication systems by sharing frequency resources at the same time and at the same place using a spectrum multiplexing technique (for example, see Non-Patent Document 1).

On the other hand, Non-Patent Document 3 discloses an adaptive-modulation orthogonal frequency-division multiplexing (OFDM) system, which changes an allocated modulation scheme in accordance with a reception level of each subcarrier.

PRIOR ART DOCUMENTS

Non-Patent Documents

Non-Patent Document 1: Tsuyoshi Yokota et al., "A Study on High Speed Wireless LAN System employing Superposed Transmission Scheme", The Institute of Electronics, Information and Communication Engineers, Technical Report of IEICE RCS, Vol. 99, No. 355, pp. 121-126, October 1999.

Non-Patent Document 2: Jun Mashino, Mamoru Akimoto, and Masashi Nakatsugawa, "A Study on Subcarrier Overlapping for OFDMA Wireless Systems", Proceedings of the 2008 IEICE General Conference, The Institute of Electronics, Information and Communication Engineers, B-5-130, p. 516, March 2008.

Non-Patent Document 3: Hideo Kobayashi, "Fundamental and Applied Technology of OFDM Communication Scheme", Triceps Co., 2004, pp. 113-130.

DISCLOSURE OF INVENTION

Problems to be Solved by the Invention

However, Non-Patent Document 1 shows an underlay-type superposed transmission in which a spread spectrum signal is arranged so as to be superposed on a non-spread spectrum signal. A superposed rate generally becomes 100% in a communication system in accordance with this condition, but there is a problem in that a spread spectrum-type system has a limitation on a transfer speed or an extensively wide frequency band is required for realizing a high-speed transfer. Also, it is not possible to perform a superposed transmission of signals between non-spread spectrum communication systems.

In addition, Non-patent Document 2 shows a downlink when the same communication system is used, and performs a superposed transmission using the same subcarrier only for terminal stations capable of mutually securing a sufficient desired-to-undesired signal ratio (a D/U ratio). However, in this downlink transmission, frequency synchronization must be established between transmitting station devices.

As described above, several schemes have previously been reported, but their applicable ranges are limited by set conditions. For example, although it is expected that a superposed multicarrier transmission provides effective utilization of frequency resources, superposed signals in the previous reports are only combinations of up to two signals. A superposition of three or more signals has not been reported, despite the impracticality of limiting the number of superposed signals to two in actual use. Thus, ways how to arrange spectra in terms of effective frequency utilization have not been clarified for the case in which the number of superposed signals is three or more.

Moreover, depending on the arrangement of spectra, there is a possibility that transfer performance differ between cells in which communication is provided by wireless base stations or between systems. There is a problem in that no study has been made, despite the necessity of an appropriate spectrum arrangement from the point of view of securing the fairness in using radio waves.

Furthermore, when spectra of the three or more same communication systems are continuously superposed, compared to a communication system in which spectra are arranged at ends of a used frequency band, in a communication system in which spectra are arranged in the middle, a superposed rate is increased and therefore the communication quality is deteriorated. For example, when spectra are arranged for a plurality of cells, there is a problem in that the communication quality of the cells is deteriorated, except for cells corresponding to the ends of the used frequency band.

Additionally, if a transmitter sequentially allocates a plurality of forward error correction (FEC) codes to each channel in the frequency domain when interference is occurring as shown in FIG. 27, the quality of an FEC block using a frequency band in which the interference is occurring is deteriorated. Non-Patent Document 3 changes an allocated modulation scheme in accordance with a reception level of each subcarrier, but it does not consider the realization of quality of service (QoS) required for each user in consideration of an interference region and a non-interference situation when interference is occurring in a transmission frequency band of a desired wave as described above.

The present invention has been made to solve the above-described problems in view of such circumstances, and an object thereof is to provide technology capable of improving the frequency utilization efficiency in communication using a multicarrier signal.

More specifically, an object of the present invention is to provide a control station device, a transmitting station device, a communication method, and a communication system which are capable of securing the communication quality and effectively utilizing frequencies in a plurality of systems.

In addition, another object of the present invention is to provide a transmitting station device, a communication method, and a communication system for a multicarrier signal which are capable of realizing wireless communication in accordance with a priority level of each user even when interference is occurring in part of a used band.

Means for Solving the Problems (1) To solve the above-described problems, the present invention is a communication method in a communication system configured by a transmitting station device and a receiving station device for transmitting and receiving a multicarrier signal using a spectrum including a plurality of subcarriers, the communication method including: a control step of setting a superposed rate which is a rate in which a superposed band in which interference is occurring is used in a used frequency band used for transmitting the multicarrier signal so as to increase frequency utilization efficiency of the used frequency band; and a transmitting step of transmitting the multicarrier signal using a spectrum allocated in accordance with the set superposed rate.

(2) In the communication method of the present invention, the communication method may be a communication method when three or more communication systems simultaneously perform communication, the communication method may further include: a superposed band recognizing step of pre-recognizing, by the receiving station device, the superposed band with another communication system in the spectrum arranged in its own communication system; an interference suppressing step of applying, by the receiving station device, interference suppressing technology to the superposed band; and an error-correction decoding step of receiving, by the receiving station device, the multicarrier signal addressed to its own receiving station device by error-correction decoding a signal to which the interference suppressing technology is applied, the control step may includes: a spectrum arranging step of deriving the superposed rate from a bandwidth of each spectrum and a predetermined superposed bandwidth in which each spectrum is superposed on another spectrum and of arranging each spectrum so that the superposed rate of each spectrum is the same; and a spectrum allocating step of allocating the spectrum arranged in its own communication system, and in the transmitting step, the transmitting station device may transmit the multicarrier signal using the spectrum allocated to its own communication system.

(3) Additionally, in the communication method of the present invention, the bandwidth of the spectrum may be variable for each communication system, and in the spectrum arranging step, two spectra having a narrower bandwidth than other spectra among spectra may be arranged at ends of the used frequency band, and each spectrum may be arranged so that the superposed rate of each spectrum is the same.

(4) Additionally, in the communication method of the present invention, the interference suppressing step may perform interference suppression by attenuating a received signal in the recognized superposed band using a frequency filter.

(5) Additionally, in the communication method of the present invention, the interference suppressing step may mask a likelihood of a received signal of the recognized superposed band, and the error-correction decoding step may receive the multicarrier signal addressed to its own receiving station device by error-correction decoding the received signal in which the likelihood is masked.

(6) Additionally, in the communication method of the present invention, the spectrum arranging step may arrange the spectrum based on a result detected by an interference signal detecting section provided in the receiving station device.

(7) Additionally, in the communication method of the present invention, the spectrum arranging step may arrange the spectrum based on a result detected by an interference signal detecting section provided in the transmitting station device.

(8) Additionally, in the communication method of the present invention, the spectrum arranging step arranges the spectrum based on a result detected by an interference signal detecting section provided in a control station device which is different from either of the transmitting station device and the receiving station device.

(9) Additionally, the communication method of the present invention may include: a coding and modulating step of coding and modulating data of a user; a superposed rate deciding step of setting a superposed rate which is a rate of an interference band in a frequency band used in transmission of the data of the user to be lower than a superposed rate which is a rate of an interference band in a frequency band used by the multicarrier signal if a service quality requirement of the user is higher than a predetermined service quality; a subcarrier allocating step of allocating the data of the user coded and modulated in the coding and modulating step to subcarriers in a non-interference band and an interference band in accordance with the superposed rate set in the superposed rate deciding step; a multicarrier modulating step of modulating the data of the user coded and modulated in the coding and modulating step into the subcarriers allocated in the subcarrier allocating step; and a parallel/serial conversing step of generating the multicarrier signal by performing serial conversion on the subcarriers modulated in the multicarrier modulating step.

(10) Additionally, in the communication method of the present invention, in the coding and modulating step, data of a plurality of different users may be coded and modulated, in the superposed rate deciding step, for each of the users, a superposed rate of each user may be set to be lower than the superposed rate which is the rate of the interference band in the frequency band used by the multicarrier signal, if the service quality requirement of each user is higher than the predetermined service quality, and the superposed rate of each user may be set to be higher than the superposed rate which is the rate of the interference band in the frequency band used by the multicarrier signal, if the service quality requirement of each user is lower than the predetermined service quality, in order that an average superposed rate of all the users is equal to the superposed rate which is the rate of the interference band in the frequency band used by the multicarrier signal, in the subcarrier allocating step, for each user, the data of each user coded and modulated in the coding and modulating step may be allocated to the subcarriers in the non-interference and the interference band in accordance with the superposed rate of each user set in the superposed rate deciding step, and in the multicarrier modulating step, for each user, the data of each user coded and modulated in the coding and modulating step may be modulated into the subcarriers allocated to the data of each user in the subcarrier allocating step.

(11) Additionally, the present invention is a control station device for determining an arrangement of a spectrum when three or more communication systems respectively configured by a transmitting station device and a receiving station device for transmitting and receiving a multicarrier signal using a spectrum including a plurality of subcarriers simultaneously perform communication, the control station device including: an interference signal detecting section which detects an interference signal in a superposed band with another communication system in the spectrum; a spectrum arranging section which derives a superposed rate from a bandwidth of each spectrum and a predetermined superposed bandwidth in which each spectrum is superposed on another spectrum and which arranges each spectrum so that the superposed rate of each spectrum is the same; a spectrum allocating section which allocates a spectrum arranged in a communication system in which the transmitting station device, which transmits the multicarrier signal using the allocated spectrum, communicates with the receiving station device, which receives a multicarrier signal addressed to its own receiving station device by recognizing the superposed band with the other communication system in the arranged spectrum, by applying interference suppressing technology to the superposed band, and by error-correction decoding a signal; and a control information distributing section which reports the allocated spectrum to the transmitting station device of its own communication system and another communication system.

(12) Additionally, the present invention is a transmitting station device in a communication system configured by the transmitting station device and a receiving station device for transmitting and receiving a multicarrier signal using a spectrum including a plurality of subcarriers, the transmitting station device including: a control section which sets a superposed rate which is a rate in which a superposed band in which interference is occurring is used in a used frequency band used for transmitting the multicarrier signal so as to increase frequency utilization efficiency of the used frequency band; and a transmitting section which transmits the multicarrier signal using a spectrum allocated in accordance with the set superposed rate.

(13) In the transmitting station device of the present invention, three or more communication systems may simultaneously perform communication, and the control section may include: a spectrum arranging section which derives the superposed rate from a bandwidth of each spectrum and a predetermined superposed bandwidth in which each spectrum is superposed on another spectrum, and arranges each spectrum so that the superposed rate of each spectrum is the same; and a spectrum allocating section which allocates the spectrum arranged in its own communication system.

(14) Additionally, the transmitting station device of the present invention may include an interference signal detecting section which detects an interference signal in the superposed band with another communication system in the spectrum so as to arrange the spectrum.

(15) Additionally, the transmitting station device of the present invention may include: a coding and modulating section which codes and modulates data of a user; a superposed rate deciding section which sets a superposed rate which is a rate of an interference band in a frequency band used in transmission of the data of the user to be lower than a superposed rate which is a rate of an interference band in a frequency band used by the multicarrier signal if a service quality requirement of the user is higher than a predetermined service quality; a subcarrier allocating section which allocates the data of the user coded and modulated by the coding and modulating section to subcarriers in a non-interference band and an interference band in accordance with the superposed rate set by the superposed rate deciding section; a multicarrier modulating section which modulates the data of the user coded and modulated by the coding and modulating section into the subcarriers allocated by the subcarrier allocating section; and a parallel/serial converting section which generates the multicarrier signal by performing serial conversion on the subcarriers modulated by the multicarrier modulating section.

(16) Additionally, the transmitting station device of the present invention may include a plurality of coding and modulating sections, wherein the plurality of coding and modulating sections may respectively code and modulate data of different users, the superposed rate deciding section may set, for each of the users, a superposed rate of each user to be lower than the superposed rate which is the rate of the interference band in the frequency band used by the multicarrier signal, if a service quality requirement of each user is higher than the predetermined service quality, and may set, for each user, the superposed rate of each user to be higher than the superposed rate which is the rate of the interference band in the frequency band used by the multicarrier signal, if the service quality requirement of each user is lower than the predetermined service quality in order that an average superposed rate of all the users is equal to the superposed rate which is the rate of the interference band in the frequency band used by the multicarrier signal, the subcarrier allocating section may allocate, for each user, the data of the user coded and modulated by the coding and modulating section to the subcarriers in the non-interference band and the interference band in accordance with the superposed rate of each user set by the superposed rate deciding section, and the multicarrier modulating section may modulate, for each user, the data of each user coded and modulated by the coding and modulating section into the subcarriers allocated to the data of each user by the subcarrier allocating section.

(17) Additionally, in the transmitting station device of the present invention, the superposed rate deciding section may set the superposed rate of the user to be increased if a reception quality of the data of the user is higher than a predetermined threshold, and may set the superposed rate of the user to be lowered if the reception quality of the data of the user is lower than the predetermined threshold.

(18) Additionally, the transmitting station device of the present invention may further include a modulation and coding level determining section which determines a modulation and coding level based on the superposed rate set by the superposed rate deciding section, wherein the coding and modulating section may code and modulate the data of the user in accordance with the modulation and coding level determined by the modulation and coding level determining section.

(19) Additionally, the present invention is a communication system for determining an arrangement of a spectrum when three or more communication systems respectively configured by a transmitting station device and a receiving station device for transmitting and receiving a multicarrier signal using a spectrum including a plurality of subcarriers simultaneously perform communication, the communication system including: a spectrum arranging section which derives a superposed rate from a bandwidth of each spectrum and a predetermined superposed bandwidth in which each spectrum is superposed on another spectrum and which arranges each spectrum so that the superposed rate of each spectrum is the same; a spectrum allocating section which allocates the arranged spectrum; a transmitting section which transmits the multicarrier signal using the allocated spectrum; and a receiving section which receives the multicarrier signal addressed to its own receiving section by recognizing a superposed band with another communication system in the allocated spectrum, by applying interference suppressing technology to the superposed band, and by error-correction decoding a signal.

Effects of the Invention

In accordance with the present invention, it is possible to improve the frequency utilization efficiency of a used frequency band used for transmitting a multicarrier signal by setting a superposed rate in a communication system for transmitting and receiving the multicarrier signal using a spectrum including a plurality of subcarriers.

Also, in accordance with the present invention, a spectrum arrangement is determined when three or more communication systems respectively configured by a transmitting station device and a receiving station device for transmitting and receiving a multicarrier signal using a spectrum including a plurality of subcarriers simultaneously perform communication. The transmitting station device transmits the multicarrier signal using a spectrum allocated to its own system. The receiving station device pre-recognizes a superposed band with another communication system in the spectrum arranged in its own system. The receiving station device applies interference suppressing technology to the superposed band, and receives the multicarrier signal addressed to its own receiving station device by error-correction decoding a signal to which the interference suppressing technology is applied. A superposed rate is derived from a bandwidth of each spectrum and a predetermined superposed bandwidth in which each spectrum is superposed on another spectrum, and each spectrum is arranged so that the superposed rate of each spectrum is the same.

In this way, by arranging each spectrum so that the superposed rate of each spectrum is the same, it is possible to provide a frequency arrangement method capable of reducing an influence due to a superposition for each spectrum and of effectively utilizing frequencies while securing the substantial communication quality.

Also, in the present invention, the bandwidth of a spectrum is variable for each communication system, and in the spectrum arranging step, two spectra having a narrower bandwidth than the other spectra are arranged at ends of the used frequency band, and each spectrum is arranged so that the superposed rate of each spectrum is the same.

With such an arrangement, it is possible to secure a predetermined band even in a spectrum having a narrow bandwidth. Moreover, it is possible to increase the total transfer efficiency by arranging spectra so that the superposed rate of each spectrum is the same.

Also, in the present invention, the receiving station suppresses the interference by attenuating a received signal of a recognized superposed band using a frequency filter. Thereby, a band including an interference wave can be removed, and the interference wave in the received signal can be suppressed.

Also, in the present invention, the receiving station receives the multicarrier signal addressed to its own receiving station device by masking a likelihood of the received signal in the recognized superposed band and by error-correction decoding the received signal in which the likelihood is masked.

Thereby, a spectrum including an interference wave can be removed, and the interference wave in the received signal can be suppressed.

Also, in accordance with the present invention, when interference is occurring in part of a frequency band of a desired wave, the transmitting station device of the multicarrier signal can perform wireless communication of the quality corresponding to required priority by changing a superposed rate in accordance with the priority of each user. Moreover, it is possible to improve the frequency utilization efficiency by changing the superposed rate in accordance with the reception quality of data.

MODE FOR CARRYING OUT THE INVENTION

Hereinafter, communication systems in accordance with respective embodiments of the present invention will be described with reference to the drawings.

Compared to conventional communication systems, one of features of the respective embodiments of the present invention is that a superposed rate (i.e., a rate in which a superposed band in which interference is occurring is used in a frequency band used to transmit a signal, the rate being derived from a bandwidth of a spectrum and a predetermined superposed bandwidth which is superposed on another spectrum) is set so as to improve the total frequency utilization efficiency.

(First Embodiment)

Figure 1:
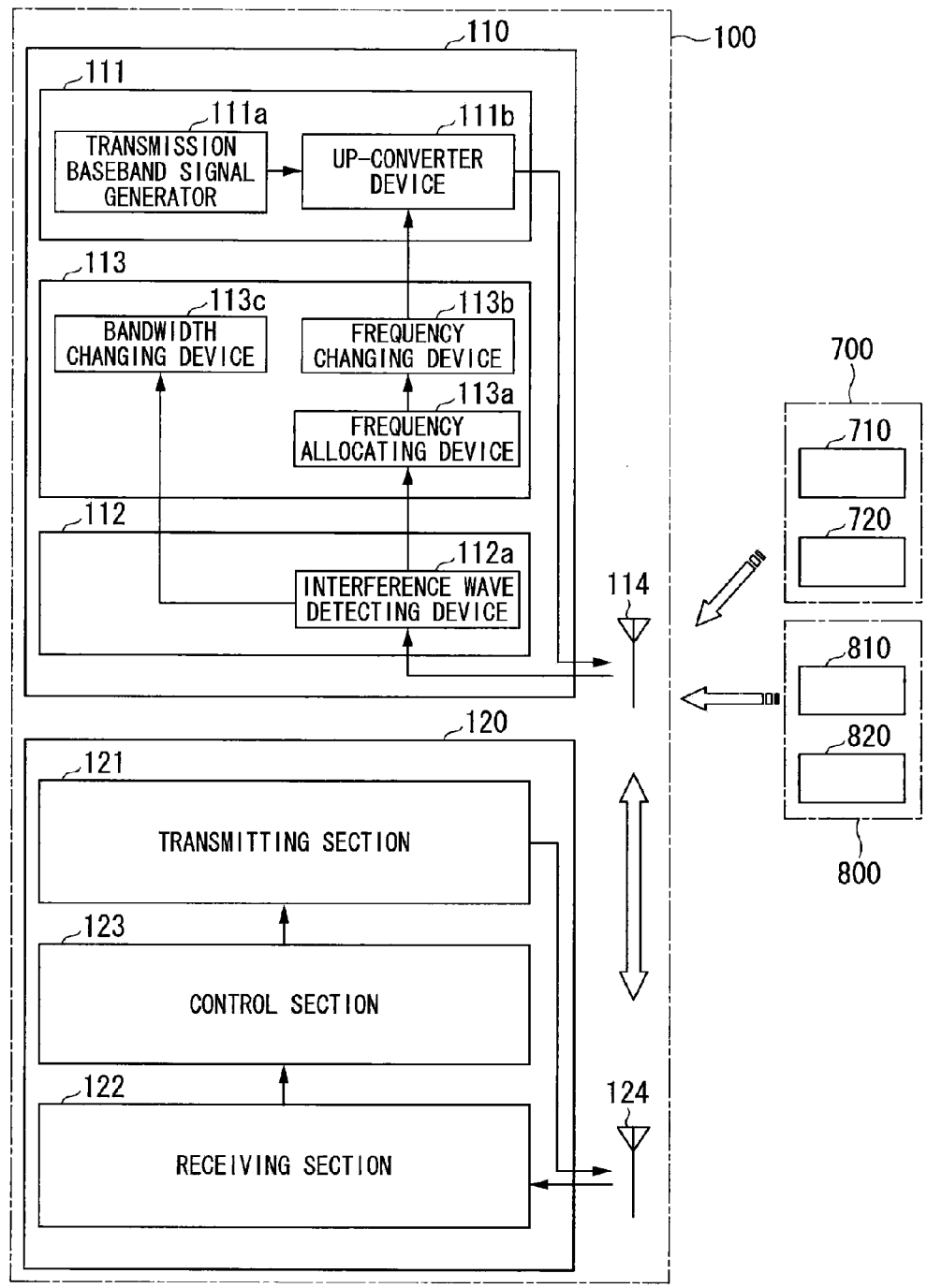
FIG. 1 is a block diagram showing a communication system in accordance with a first embodiment of the present invention.

FIG. 1 is a block diagram showing a communication system in accordance with a first embodiment of the present invention.

In this figure, communication systems 100, 700, and 800 are shown as three communication systems that perform communication using radio waves of the same frequency. The communication systems 100, 700, and 800 are independent communication systems using the same system configuration.

The communication system 100 is provided with a base station device 110 and a terminal station device 120. The communication system 700 is provided with a base station device 710 and a terminal station device 720. The communication system 800 is provided with a base station device 810 and a terminal station device 820.

Frequencies allocated to the respective communication systems are arranged so that bands of radio waves to be used are superposed.

Figure 2A:
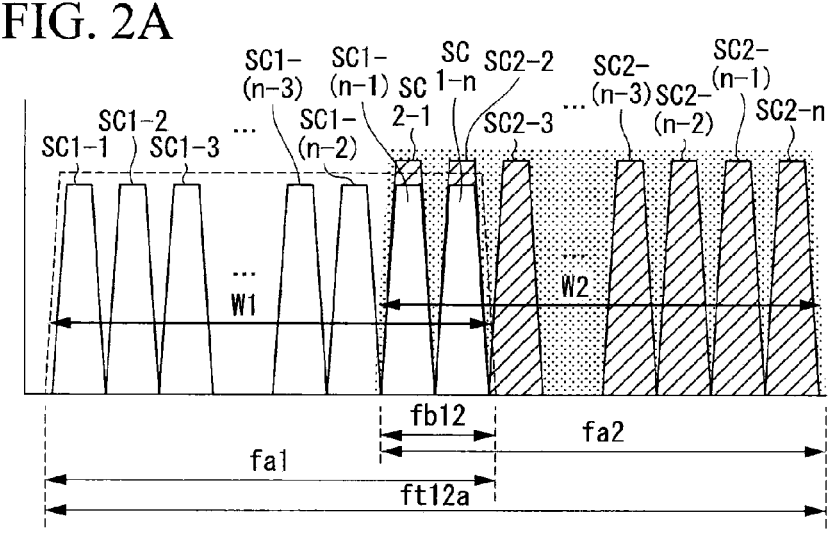
FIG. 2A is a diagram showing a superposition in a frequency arrangement in accordance with the first embodiment.
Figure 2B:
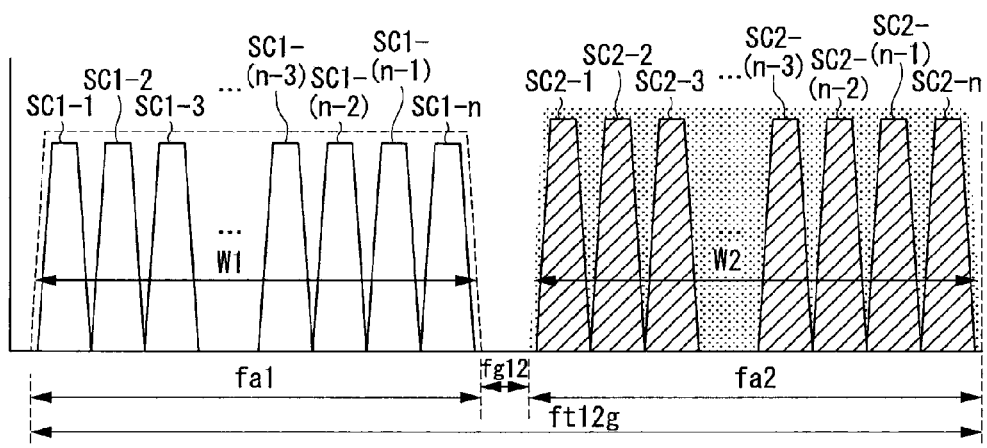
FIG. 2B is a diagram showing a superposition in a frequency arrangement in accordance with the first embodiment.
Figure 2C:
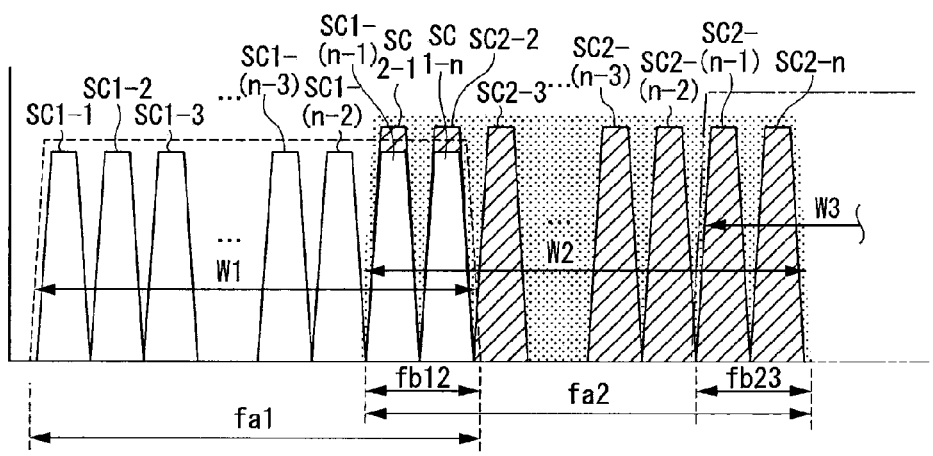
FIG. 2C is a diagram showing a superposition in a frequency arrangement in accordance with the first embodiment.

FIGS. 2A to 2C are conceptual diagrams showing superposed states in frequency arrangements in accordance with the first embodiment.

FIG. 2A shows a signal W1 on which a desired signal allocated in a frequency domain is carried and a signal W2 which is allocated so that part of its band (a band fb12) overlaps the signal W1. In this figure, the vertical axis represents power and the horizontal axis represents frequency.

The signal W1 has a band fa1 which is represented by a Nyquist frequency and which accommodates a plurality of subcarriers SC1-1 to SC1-$n$ that carry the signal W1.

The signal W2 has a band fa2 which is represented by a Nyquist frequency and which accommodates a plurality of subcarriers SC2-1 to SC2-$n$ that carry the signal W2.

Here, assuming that the desired signal is the signal 1, a desired wave is transmitted by the band fa1 and a carrier wave carrying the signal 2 transmitted by the band fa2 becomes an interference wave.

A superposed rate of the carrier wave of the signal W1 is Rov1=fb12/fa1, and a superposed rate of the carrier wave of the signal W2 is Rov2=fb12/fa2.

In the frequency arrangement shown in FIG. 2B, an allocation having no superposed band is shown. In this figure, the vertical axis represents power and the horizontal axis represents frequency. This arrangement shows the signal W1 on which the desired signal allocated in a frequency domain is carried and the signal W2 adjacent to the signal W1 via a guard band (fg12).

Since the signal W1 and the signal W2 shown in FIG. 2B have the same bands fa1 and fa2 as those of FIG. 2A, in accordance with a conventional allocation method which performs an allocation without superposition, an occupied frequency band is broadened and the utilization efficiency is deteriorated.

In the frequency arrangement shown in FIG. 2C, a state is shown in which three signals (W1, W2, and W3) are continuously arranged and allocated. It is noted that the signal W3 is a signal in which part of its band (a band fb23) overlaps the signal W2. In this figure, the vertical axis represents power and the horizontal axis represents frequency. Since the band of the signal W2 shown in this figure is superposed not only on the band of the signal W1 but also on the band of the signal W3, its superposed rate is as follows.

$$Rov2' = (fb12 + fb23)/fa2$$

In this way, one of the bands shown in FIG. 2C is allocated to each of the communication systems. Additionally, it is possible to specify a range in which each communication system and another communication system may be affected by interference when each communication system receives a radio wave of the other communication system.

Referring again to FIG. 1, devices constituting each communication system will be described. Hereinafter, a configuration of each communication system will be described using an example of a downlink in the communication system 100 as a representative (i.e., a direction from the base station device 110 to the terminal station device 120).

The base station device 110 in the communication system 100 is provided with a transmitting section 111, a receiving section 112, a control section 113, and an antenna 114.

The transmitting section 111 in the base station device 110 generates a transmission signal for the terminal station device 120.

The transmitting section 111 is provided with a transmission baseband signal generator 111a and an up-converter device 111b. The transmission baseband signal generator 111a in the transmitting section 111 generates transmission baseband signals based on information to be transmitted. The generated transmission baseband signals are output in synchronization with transmission frequencies. The transmission frequencies are determined in accordance with an allocated band, and are controlled by bandwidth control information.

The up-converter device 111b frequency-converts the input transmission baseband signals based on the set transmission frequencies, and outputs frequency converted signals. The transmission signals output from the up-converter device 111b are transmitted from the antenna 114 through a transmission signal processing section (not shown) which performs coding processing, error-correction coding processing, and modulation processing (not shown). An output radio signal is allocated to a channel having a band to be carried by a plurality of subcarriers.

The receiving section 112 performs receiving processing on an input received signal. The receiving section 112 is provided with an interference wave detecting device 112a. The interference wave detecting device 112a detects, from the input received signal, a frequency band in which interference occurs due to a radio signal transmitted from another system in a used frequency band of a desired wave of the base station device 110.

For example, the interference wave detecting device 112a detects a specific subcarrier in which interference occurs by detecting the presence/absence of another radio signal, signal strength, and the like for each subcarrier in the used frequency band of the desired wave in an environment where no desired wave is transmitted.

For example, the interference wave detecting device 112a generates a sequence of specific subcarrier decision values as a sequence of interference band decision values in which "1" is associated with a specific subcarrier and "0" is associated with a subcarrier other than the specific subcarrier. The interference wave detecting device 112a outputs the detected result as interference wave information.

A frequency allocating device 113a in the control section 113 selects a channel to be used in its own communication system in accordance with a determined rule based on the interference band decision values which indicate interference situations of respective subcarriers and which are input as the interference wave information. A frequency changing device 113b allocates frequencies to be used by the respective subcarriers in accordance with the frequency arrangement in the channel, and changes transmission frequencies in accordance with the allocated frequencies. A bandwidth changing device 113c selects a bandwidth capable of being transmitted by its own communication system in accordance with a determined rule based on the interference band decision values which indicate interference situations of the respective subcarriers and which are input as the interference wave information. The bandwidth changing device 113c controls a bandwidth transmitted by the transmitting section 111 based on the selected bandwidth.

In the communication system 100, the terminal station device 120 constantly scans frequencies and follows an allocation of frequencies transmitted by the opposite base station device 110. The terminal station device 120 is provided with a transmitting section 121, a receiving section 122, and a control section 123.

The transmitting section 121 in the terminal station device 120 converts a signal to be transmitted from the terminal station device 120 into a radio signal and outputs the radio signal via an antenna 124. The transmitting section 121 generates a transmission signal for the opposite base station device 110. The receiving section 122 receives a radio signal from the opposite base station device 110. An interference signal is included in an interference band of the radio signal received by the receiving section 122. In order to reduce an influence of the interference signal, the receiving section 122 is provided with a configuration for removing the interference signal.

An embodiment of the receiving section 122 will be described.

Figure 3:
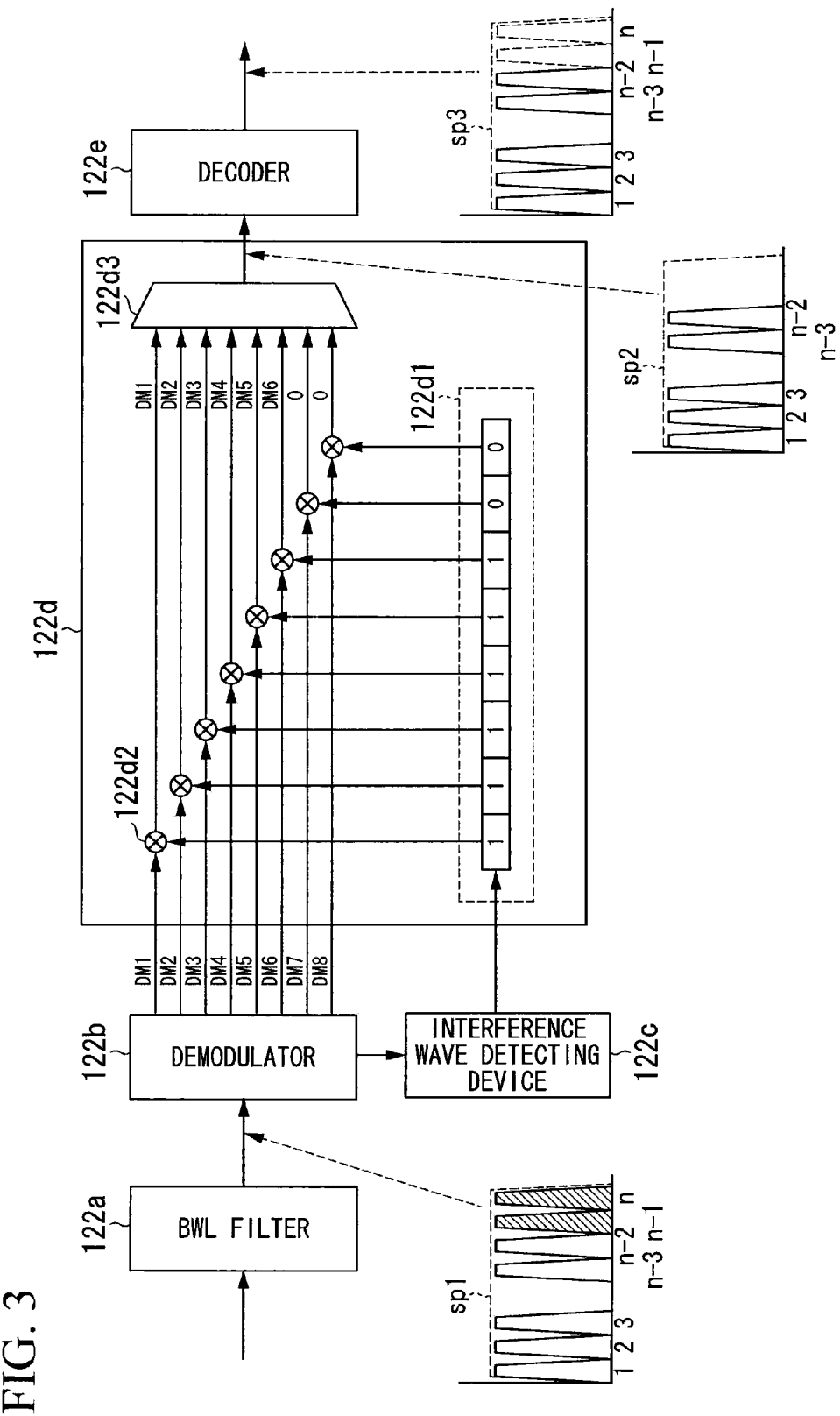
FIG. 3 is a block diagram showing a receiving station device in accordance with the first embodiment.

FIG. 3 is a block diagram showing a receiving station device in accordance with the first embodiment.

The receiving section 122 is provided with a BWL filter 122a, a demodulator 122b, an interference wave detecting device 122c, a masking processing section 122d, and a decoder 122e.

The bandwidth limitation filter (BWL filter) 122a in the receiving section 122 selectively passes the band of a desired channel through.

The demodulator 122b converts a radio signal including a received desired wave that has been subjected to error-correction coding into electrical signals for the respective subcarriers, and outputs demodulated values DM1 to DM8 for the respective subcarriers.

The interference wave detecting device 122c recognizes an interference wave based on an input received signal by detecting an interference signal in an interference band from a band included in the channel.

The masking processing section 122d is provided with a masking code generator 122d1, a masking processing section 122d2, and a combiner 122d3.

The masking code generator 122d1 in the masking processing section 122d outputs a masking code for masking a demodulated value of a subcarrier to be masked in accordance with input interference signals for the respective subcarriers. In the figure, demodulated values of subcarriers to be masked are the demodulated values DM7 and DM8. In the masking code generated by the masking code generator 122d1, a subcarrier to be masked is denoted by "0", and a subcarrier not to be masked is denoted by "1". The masking processing section 122d2 performs multiplication processing in accordance with the input demodulated values and the generated masking code. Masking processing is performed as a result of the multiplication processing, the demodulated values DM7 and DM8 are replaced with "0", and signals of the other demodulated values DM1 to DM6 are passed through. The combiner 122d3 multiplexes the signals of the demodulated values DM1 to DM6 and "0" with which the demodulated values DM7 and DM8 are replaced, and outputs the multiplexed signal to the decoder 122e as a selected data sequence.

The decoder 122e performs error correction processing and decoding processing based on the data sequence selected by the masking processing section 122d, and outputs the decoded result for the respective subcarriers. As the decoding processing in the decoder 122e, decoding processing corresponding to a coding method of the desired wave can be selected.

As a result of the above processing, the interference signal included in the interference band is removed by the masking processing section 122d, so that decoding processing of the received signal can be performed.

A frequency arrangement determination rule will be described with reference to the drawings.

Figure 4:
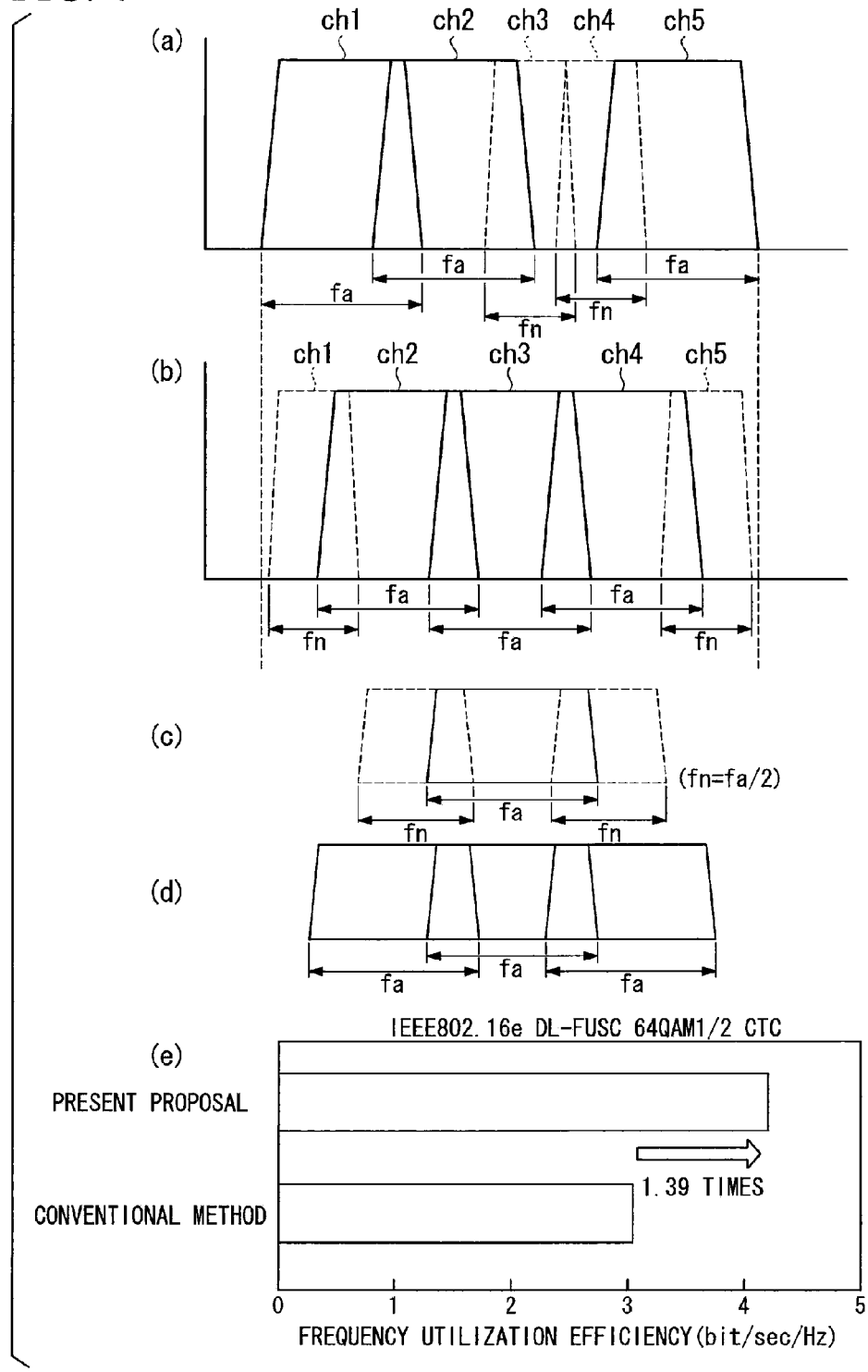
FIG. 4 is a diagram showing frequency arrangements in accordance with the first embodiment.

FIG. 4 is a diagram showing frequency arrangements in the first embodiment.

In this figure, the vertical axis represents power and the horizontal axis represents frequency. In a range shown in a frequency domain in this figure, five channels having different frequency bands are arranged. Since the respective channels are superposed, the five channels are allocated to a narrower band compared to the sum of the bands of the respective channels. Although interference occurs in each channel as a result of the superposition of the respective channels, the degradation of an error rate can be prevented by error compensation or the like in the decoding processing. The superposed channels are channels ch1, ch2, ch3, ch4, and ch5 in ascending order of frequency, and an arrangement which maximizes a total transfer capacity is selected.

A rule for allocating spectra of respective systems to respective channels will be shown. As a spectrum arrangement method shown in the present embodiment, a spectrum arrangement method is shown which is suitable for the case in which respective channels have different spectral widths (frequency widths) and the bands of the channels including the spectra have different frequency bandwidths.

FIG. 4(a) shows an example of an arrangement that does not employ the arrangement method of the present embodiment. The following equation represents frequency bandwidths pf of the respective channels shown in this figure using an array.

$$(pf1,pf2,pf3,pf4,pf5)=(fa,fa,fn,fn,fa)$$

The frequency bandwidths fa and fn of the respective channels are different. There are distinctly different frequency bandwidths as, for example, in the case where fa is 10 MHz and fn is 5 MHz. Thus, if channels of bands having narrow frequency bandwidths are superposed and are continuously allocated, each band shares superposed bands with two channels adjacent thereto in the frequency domain. As a result, a frequency band that can be occupied is narrowed and the substantial communication quality is deteriorated.

FIG. 4(b) shows an example of an arrangement in accordance with the arrangement method of the present embodiment. The following equation represents frequency bandwidths f of respective channels shown in this figure using an array.

$$(f1,f2,f3,f4,f5)=(fn,fa,fa,fa,fn)$$

In terms of the frequency bandwidths f1, f2, f3, f4, and f5 of the respective channels, channels having different frequency bandwidths (fa and fn) are allocated. As shown in the figure, the frequency bandwidth fa occupies a wider frequency range than the frequency bandwidth fn, and its substantial band is also wider. In this way, narrow-band spectra are arranged at ends of a used frequency band. That is, two spectra having a narrower bandwidth than the other spectra are arranged at the ends of the used frequency band. More specifically, the narrowest band spectrum and the second narrowest band spectrum are arranged at the ends of the used frequency band. It is noted that if there are a plurality of narrowest band spectra, two of these spectra are arranged at the ends of the used frequency band. In addition, if there is one narrowest band spectrum and there are a plurality of second narrowest band spectra, the narrowest band spectrum and one of the plurality of second narrowest band spectra are arranged at the ends of the used frequency band. Thereby, it is possible to avoid a problem caused by arranging narrow band spectra in the middle portion described above as shown in FIG. 4(a).

Subsequently, an advantageous effect of the spectrum arrangement method described above will be shown using a specific example.

FIG. 4(c) shows a case in which spectra having different frequency bandwidths are arranged on three channels. The following represents them in ascending order of frequency using an array.

$$(f1,f2,f3)=(fn,fa,fn)$$

Here, frequency bandwidths fa and fn have the following relationship.

$$fn=fa/2$$

That is, the frequency bandwidth fa of a spectrum allocated to a center channel is twice the frequency bandwidth fn of spectra allocated to end channels.

In addition, a comparison with the case in which spectra allocated to three channels all have the same frequency bandwidth fa as shown in FIG. 4(d) is performed.

FIG. 4(e) shows frequency utilization efficiencies calculated in the cases shown in the above (c) and (d). The condition of the above (c) is shown as "present proposal" and the condition of the above (d) is shown as "conventional method."

The selected conditions are as follows. A communication system to be applied is based on a downlink-full usage of subchannelization (DL-FUSC) mode to be applied to a downlink in the IEEE 802.16e standard. In addition, a modulation scheme is designated as 64 quadrature amplitude modulation (QAM) with a coding rate of 1/2, and a coding scheme is a convolutional turbo code (CTC).

As shown in FIG. 4(e), the frequency utilization efficiency by the conventional method is 3 bit/sec/Hz, but the frequency utilization efficiency by the present proposal is 4.17 bit/sec/Hz. That is, it can be seen that the frequency utilization efficiency is 1.39 times higher.

Subsequently, a frequency allocation procedure will be described with reference to the drawings.

Figure 5:
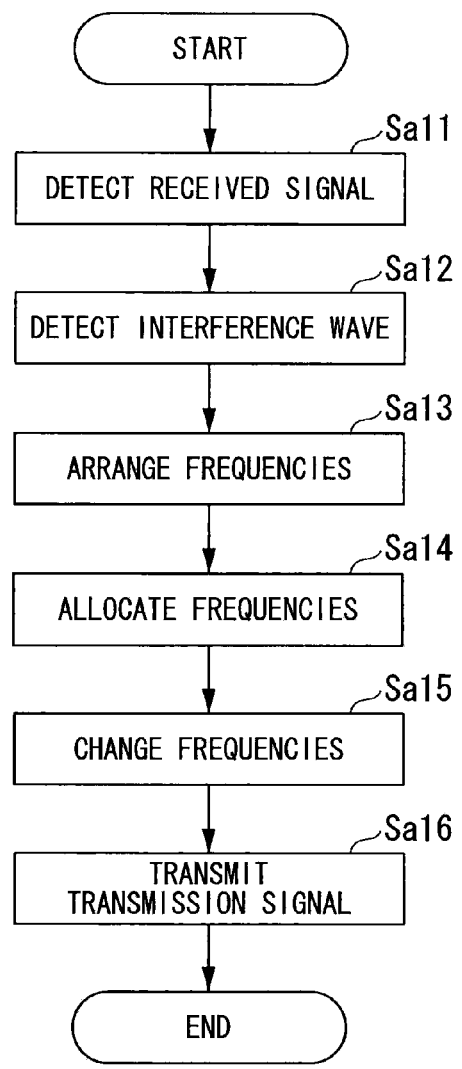
FIG. 5 is a flowchart showing an operation of the communication system in accordance with the first embodiment.

FIG. 5 is a flowchart showing an operation of the communication system in accordance with the first embodiment.

In the base station device 110 serving as a transmitting station, the receiving section 112 receives a signal to be received which has been captured by the antenna 114 (step Sa11). The interference wave detecting device 112a of the receiving section 112 detects an interference wave (step Sa12). Based on information on the detected interference wave, the frequency allocating device 113a selects and arranges a frequency arrangement in accordance with a frequency allocation rule (step Sa13). Based on the arranged frequency arrangement, the frequency allocating device 113a allocates frequencies (step Sa14). In accordance with the allocated frequencies, the frequency changing device 113b changes transmission frequencies of the transmitting section 111 (step Sa15). In the transmitting section 111, in order to adapt to a band allocated based on the allocated frequencies, the bandwidth change section 113c selects a bandwidth capable of being transmitted by its own communication system, and controls a bandwidth to be transmitted from the transmitting section 111 based on the selected bandwidth. The transmitting section 111 changes the frequency of a clock output by the transmission baseband signal generator 111a in accordance with the bandwidth control. Also, the transmitting section 111 changes output frequencies of the up-converter device 111b, generates a transmission signal, and transmits the generated transmission signal via the antenna 114 (step Sa16).

With the above procedure, it is possible to determine transmission frequencies for use in transmission by the base station device 110 based on an interference situation in a received signal received by the base station device 110.

(Second Embodiment)

Hereinafter, a communication system in accordance with a second embodiment of the present invention will be described with reference to the drawings.

Figure 6:
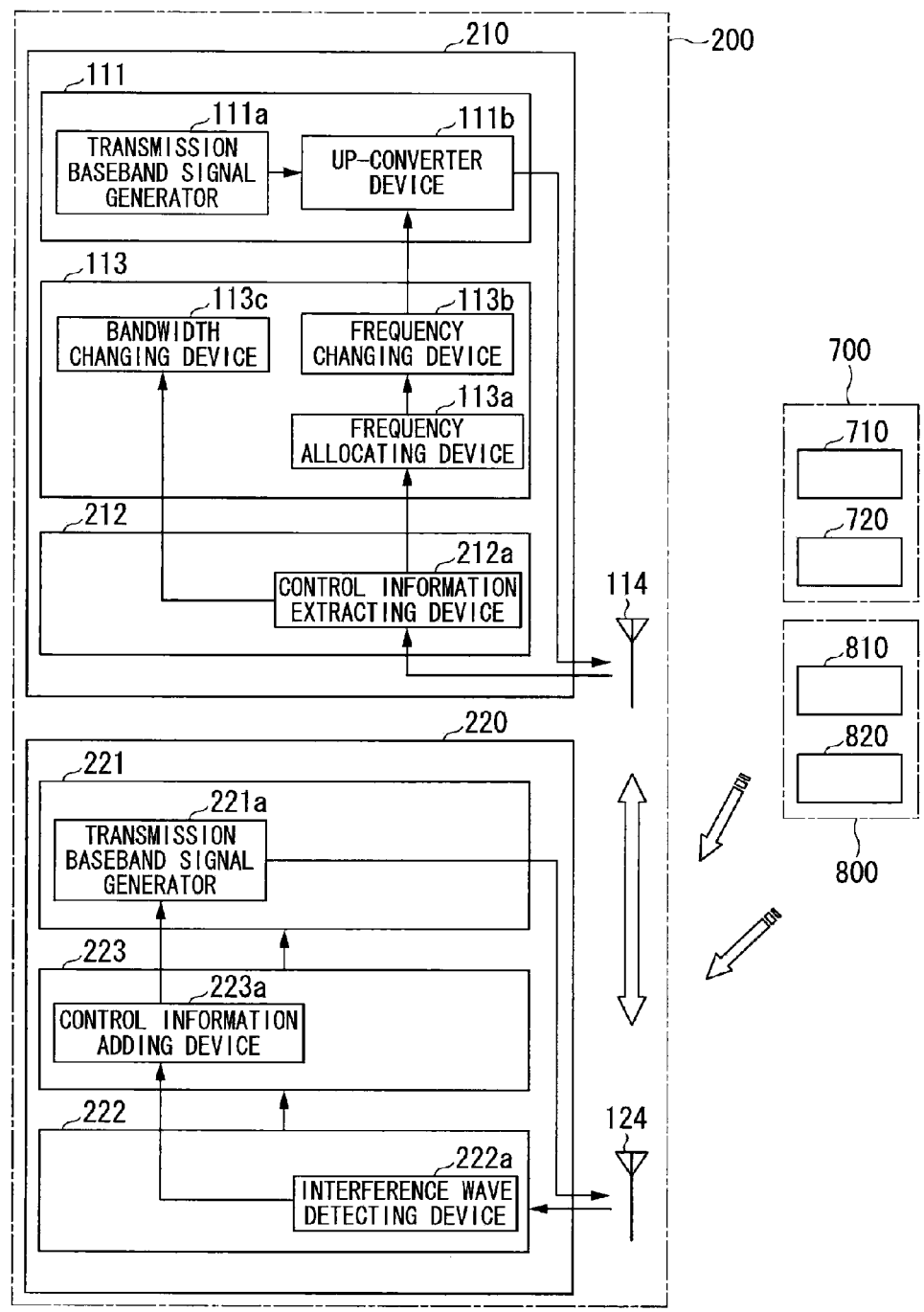
FIG. 6 is a block diagram showing a communication system in accordance with a second embodiment.

FIG. 6 is a block diagram showing the communication system in accordance with the second embodiment of the present invention.

This figure shows communication systems 200, 700, and 800 as three communication systems that perform communication using radio waves of the same frequency. The communication systems 200, 700, and 800 are independent communication systems using the same system configuration.

In FIG. 6, the same configurations as those of FIG. 1 are denoted by the same reference symbols. Hereinafter, configurations different from those of FIG. 1 will be described.

The communication system 200 is provided with a base station device 210 and a terminal station device 220 that face each other and perform communication with each other. The communication system 200 receives radio signals transmitted from the communication systems 700 and 800 as interference waves.

Hereinafter, a configuration of each communication system will be described using an example of a downlink of the communication system 200 as a representative (i.e., a direction from the base station device 210 to the terminal station device 220).

In the communication system 200, the base station device 210 is provided with a transmitting section 111, a receiving section 212, a control section 113, and an antenna 114.

The receiving section 212 in the base station device 210 performs receiving processing of an input received signal. The receiving section 212 is provided with a control information extracting device 212a. The control information extracting device 212a extracts information included in a packet transferred by means of a radio signal transmitted from the terminal station device 220. The information transmitted from the terminal station device 220 includes a reception situation at the side of the terminal station device 220, and various pieces of setting information of the terminal station device 220 which are set so as to adapt to the reception situation. The control information extracting device 212a extracts information on a frequency band in which interference occurs which is detected from a used frequency band of a radio signal (a desired wave) transmitted by the base station device 210, and outputs the extracted information as interference wave information.

The control section 113 determines a frequency arrangement in accordance with a determined rule based on the extracted interference wave information, and allocates frequencies in accordance with the arrangement. The determined rule is the same as the frequency determination rule shown in the first embodiment.

The transmitting section 111 outputs a transmission signal in accordance with the allocated frequencies.

The details of the control section 113 and the transmitting section 111 have been described above with reference to FIG. 1.

In the communication system 200, the terminal station device 220 is provided with a transmitting section 221, a receiving section 222, a control section 223, and an antenna 124.

The transmitting section 221 in the terminal station device 220 is provided with a transmission baseband signal generator 221a, which transmits information to the base station device 210. Based on input control information, the transmission baseband signal generator 221a generates a packet in which information on an interference wave is included in a control information portion. The transmission baseband signal generator 221a generates transmission baseband signals in accordance with packetized interference wave information.

The receiving section 222 receives a radio signal transmitted from the base station device 210 via the antenna 124. The receiving section 222 extracts received data by performing receiving processing on the received signal. Also, the receiving section 222 extracts information indicating the reception situation at the side of the terminal station device 220 based on the received radio signal.

The receiving section 222 is provided with an interference wave detecting device 222a. The interference wave detecting device 222a in the receiving section 222 detects, from the input received signal, a frequency band in which interference occurs due to a radio signal transmitted from another system in a used frequency band of a desired wave transmitted from the base station device 110. For example, the interference wave detecting device 222a detects a specific subcarrier in which interference occurs by detecting the presence/absence of another radio signal, signal strength, and the like for each subcarrier in the used frequency band of the desired wave in an environment where no desired wave is transmitted. For example, the interference wave detecting device 222a generates a sequence of specific subcarrier decision values as a sequence of interference band decision values in which "1" is associated with a specific subcarrier and "0" is associated with a subcarrier other than the specific subcarrier. The interference wave detecting device 222a outputs the detected result as interference wave information.

The control section 223 is provided with a control information adding device 223a. The control information adding device 223a in the control section 223 generates control information having the interference wave information included in information to be reported to the base station device 210 based on the detected interference wave information, and inputs the generated control information to the transmitting section 221.

Subsequently, a frequency allocation procedure will be described with reference to the drawings.

Figure 7:
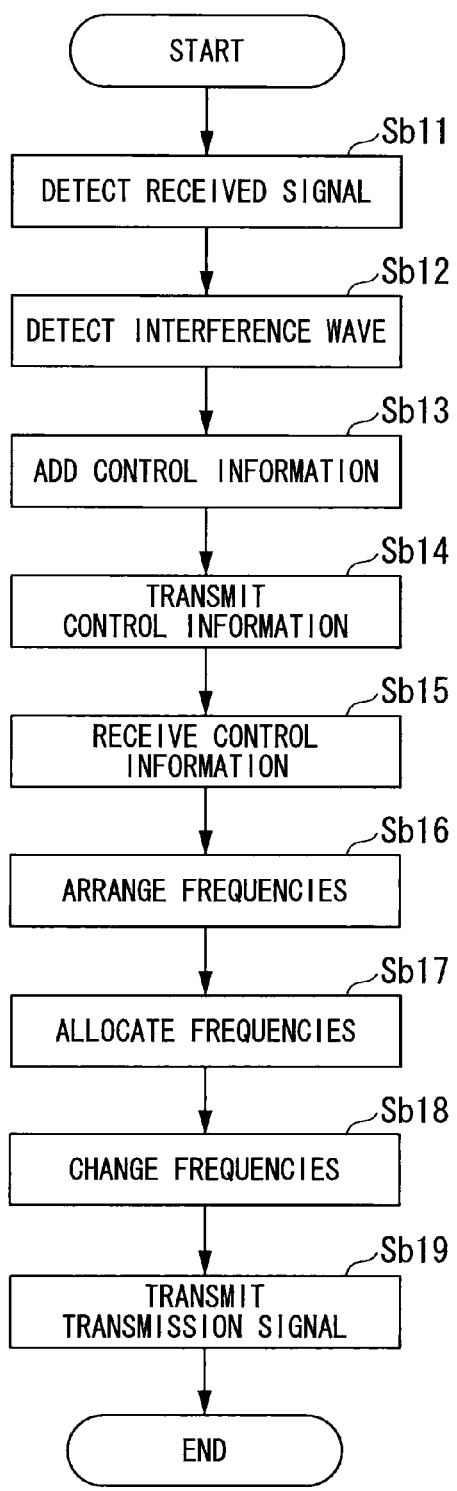
FIG. 7 is a flowchart showing an operation of the communication system in accordance with the second embodiment.

FIG. 7 is a flowchart showing an operation of the communication system in accordance with the second embodiment.

In the terminal station device 220 serving as a receiving station, the receiving section 222 receives a signal to be received which has been captured by the antenna 124 (step Sb11). The interference wave detecting device 222*a* of the receiving section 222 detects an interference wave (step Sb12).

The control information adding device 223*a* generates and outputs control information including information on the interference wave based on the detected interference wave information (step Sb13). The transmission baseband signal generator 221*a* generates and outputs a packet in which the information on the interference wave is included in the control information portion based on the input control information. The output packet is converted into a radio signal and is transmitted from the terminal station device 220 (step Sb14).

The opposite base station device 210 receives the radio signal transmitted from the terminal station device 220. The control information extracting device 212*a* in the receiving section 212 extracts the information included in the packet transferred by means of the radio signal transmitted from the terminal station device 220. The control information extracting device 212*a* outputs the interference wave information detected in the terminal station device 210 (step Sb15). The frequency allocating device 113*a* selects and arranges a frequency arrangement in accordance with a frequency allocation rule based on the output interference wave information (step Sb16). Based on the arranged frequency arrangement, the frequency allocating device 113*a* allocates frequencies (step Sb17). In accordance with the allocated frequencies, the frequency changing device 113*b* changes transmission frequencies of the transmitting section 111 (step Sb18). In order for the transmitting section 111 to adapt to an allocated band based on the allocated frequencies, the bandwidth changing device 113*c* selects a bandwidth capable of being transmitted by its own communication system, and controls a bandwidth to be transmitted from the transmitting section 111 based on the selected bandwidth. The transmitting section 111 changes the frequency of a clock output by the transmission baseband signal generator 111*a* in accordance with the bandwidth control. Also, the transmitting section 111 changes output frequencies of the up-converter device 111*b*, generates a transmission signal, and transmits the generated transmission signal via the antenna 114 (step Sb19).

With the above procedure, it is possible to determine transmission frequencies for use in transmission by the base station device 210 based on an interference situation in a received signal received by the terminal station device 220.

(Third Embodiment)

Hereinafter, a communication system in accordance with a third embodiment of the present invention will be described with reference to the drawings.

Figure 8:
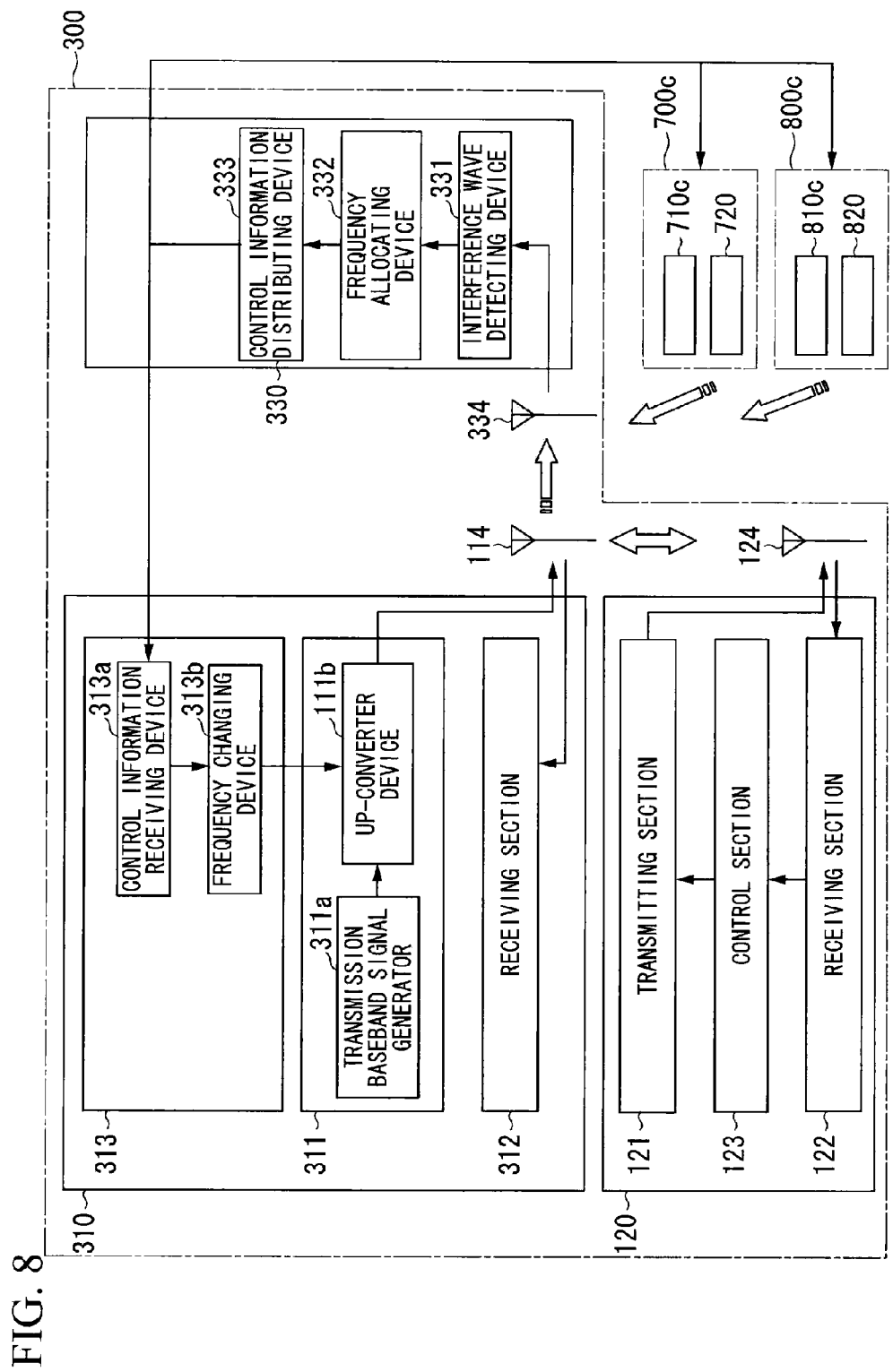
FIG. 8 is a block diagram showing a communication system in accordance with a third embodiment.

FIG. 8 is a block diagram showing the communication system in accordance with the third embodiment.

This figure shows communication systems 300, 700*c*, and 800*c* as three communication systems that perform communication using radio waves of the same frequency. The communication systems 300, 700*c*, and 800*c* are independent communication systems using the same system configuration.

The communication system 300 is provided with a base station device 310 and a terminal station device 120. The communication system 700*c* is provided with a base station device 710*c* and a terminal station device 720. The communication system 800*c* is provided with a base station device 810*c* and a terminal station device 820. The base station device and the terminal station device provided in each communication system perform communication using a determined frequency. Additionally, the communication system 300 notifies the communication systems 700*c* and 800*c* of frequency control information necessary for frequency control.

Also, in FIG. 8, the same configurations as those of FIG. 1 are denoted by the same reference symbols. Hereinafter, configurations different from those of FIG. 1 will be described.

The communication system 300 is provided with the base station device 310, the terminal station device 120, and a control station device 330 which controls the base station device 310 and the terminal station device 120. The communication system 300 receives radio signals transmitted from the communication systems 700*c* and 800*c* as interference waves. The control station device 330 detects interference situations due to the interference waves in the radio signals. Based on the interference situations, a communication means reports a result of a frequency arrangement to the base station device 310 of the communication system 300 and the respective communication systems 700*c* and 800*c*.

Hereinafter, a configuration of each communication system will be described using an example of a downlink of the communication system 300 as a representative (i.e., a direction from the base station device 310 to the terminal station device 120).

In the communication system 300, the base station device 310 is provided with a transmitting section 311, a receiving section 312, a control section 313, and an antenna 114.

The transmitting section 311 in the base station device 310 generates a transmission signal for the terminal station device 120. The transmitting section 311 is provided with a transmission baseband signal generator 311*a* and an up-converter device 111*b*. The transmission baseband signal generator 311*a* in the transmitting section 311 generates transmission baseband signals based on information to be transmitted. The generated transmission baseband signals are output in synchronization with transmission frequencies.

The receiving section 312 in the base station device 310 performs receiving processing of an input received signal.

The control section 313 is provided with a control information receiving device 313*a* and a frequency changing device 313*b*. The control information receiving device 313*a* receives the frequency control information transmitted from the control station device 330, and extracts information included in a packet transferred by a radio signal. The information transmitted from the control station device 330 is control information for controlling frequencies to be used by the communication system 300. The control information receiving device 313*a* extracts arrangement information of each channel from the frequency control information reported from the control station device 330. The frequency changing device 313*b* arranges frequencies based on the extracted arrangement information of each channel.

In the communication system 300, the control station device 330 is provided with an interference wave detecting device 331, a frequency allocating device 332, and a control information distributing device 333.

The interference wave detecting device 331 in the control station device 330 detects, from the input received signal, a frequency band in which interference occurs due to a radio signal transmitted from another system in a used frequency band of a desired wave transmitted by the base station device 310 in the communication system 300. For example, the interference wave detecting device 331 detects a specific subcarrier in which interference occurs by detecting the presence/absence of another radio signal, signal strength, and the like for each subcarrier in the used frequency band of the desired wave in an environment where no desired wave is transmitted. For example, the interference wave detecting device 331 generates a sequence of specific subcarrier decision values as a sequence of interference band decision values in which "1" is associated with a specific subcarrier and "0" is associated with a subcarrier other than the specific subcarrier. The interference wave detecting device 331 outputs the detected result as interference wave information.

The frequency allocating device 332 selects a channel to be used in its own communication system in accordance with a determined rule based on the interference band decision values indicating an interference situation for each subcarrier input as the interference wave information. Also, the frequency allocating device 332 determines a frequency arrangement based on the selected result, and allocates frequencies in accordance with the arrangement. The determined rule is the same as the frequency determination rule shown in the first embodiment.

The control information distributing device 333 distributes frequency control information including information on the selected channel to the opposite base station device 310 and the communication systems 700c and 800c.

Subsequently, a frequency allocation procedure will be described with reference to the drawings.

Figure 9:
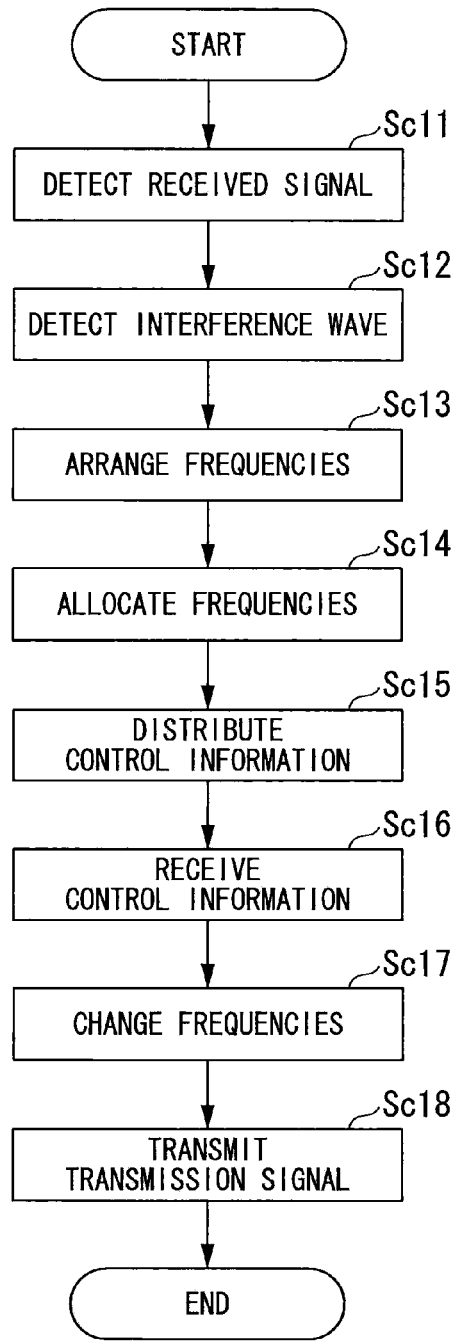
FIG. 9 is a flowchart showing an operation of the communication system in accordance with the third embodiment.

FIG. 9 is a flowchart showing an operation of the communication system in accordance with the third embodiment.

The control station device 330, which manages the frequency arrangement of the communication system 300, receives a signal to be received which has been captured by an antenna 334 (step Sc11). The interference wave detecting device 331 detects an interference wave and outputs interference wave information (step Sc12).

The frequency allocating device 332 selects and arranges a frequency arrangement in accordance with a frequency allocation rule based on the output interference wave information (step Sc13).

Based on the arranged frequency arrangement, the frequency allocating device 332 allocates frequencies (step Sc14). The control information distributing device 333 distributes frequency control information including information on the allocated frequencies to the base station device 310 and the communication systems 700c and 800c using the communication means (step Sc15).

The opposite base station device 310 receives the frequency control information transmitted from the control station device 330. The control information receiving device 313a in the control section 313 extracts the information on the allocated frequencies transmitted from the control station device 330 (step Sc16).

The frequency changing device 313b changes transmission frequencies of the transmitting section 311 in accordance with the extracted information on the allocated frequencies (step Sc17). Based on the allocated frequencies, the transmitting section 311 changes output frequencies of the up-converter device 111b, generates a transmission signal, and transmits the transmission signal via the antenna 114 (step Sc18).

With the above procedure, it is possible to determine transmission frequencies to be transmitted by the base station device 310 based on an interference situation in a received signal received by the control station device 330. By distributing frequencies used by the communication system 300 to the communication systems 700c and 800c, the communication systems 700c and 800c can efficiently arrange frequencies to be used by each system in consideration of the frequencies. Thus, it is possible to improve the quality of each communication system by reducing mutual interference.

(Fourth Embodiment)

Hereinafter, a receiving section provided in a receiving station (a terminal station device) in a communication system in accordance with a fourth embodiment of the present invention will be described with reference to the drawings.

Figure 10:
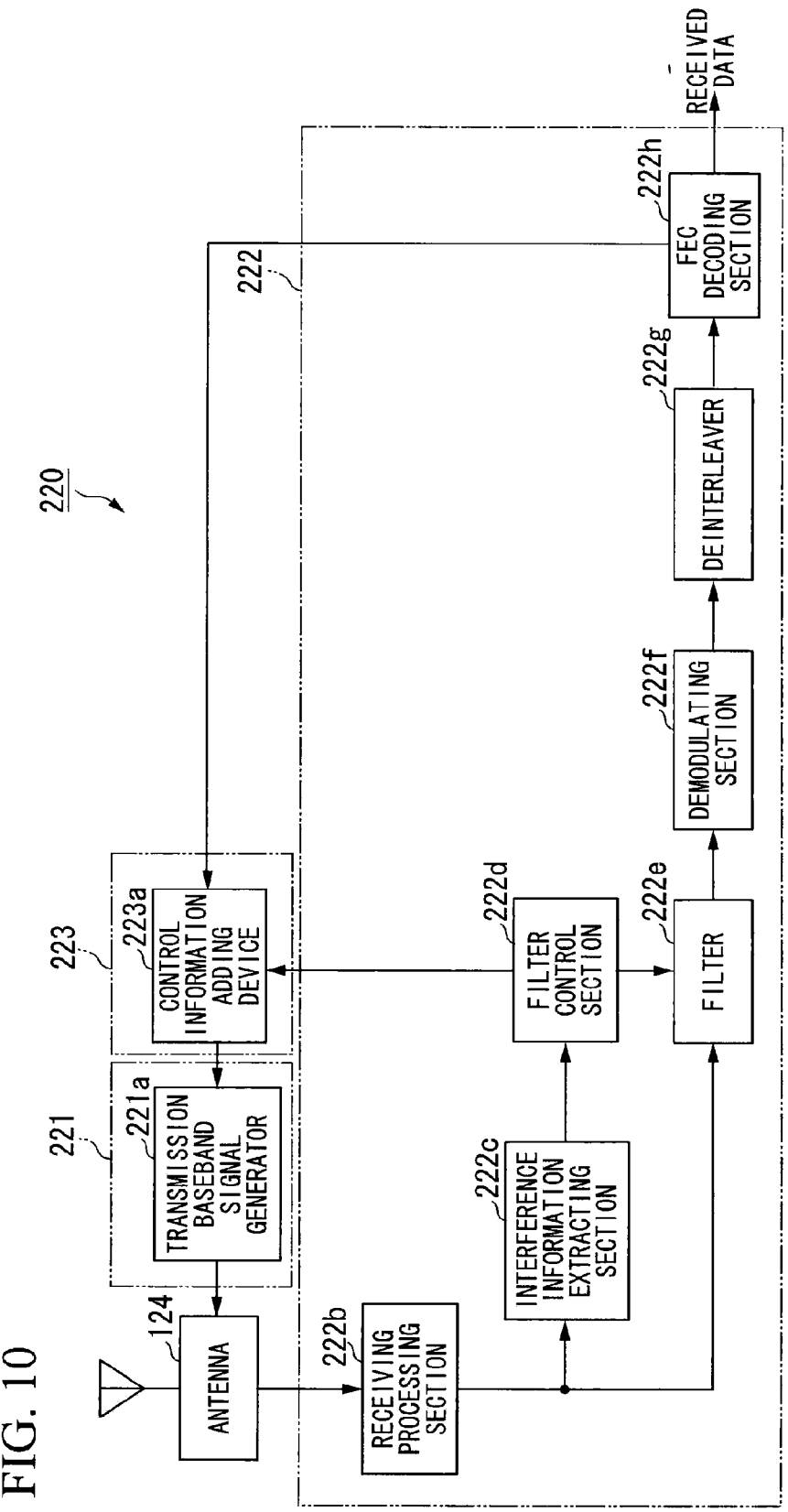
FIG. 10 is a block diagram showing a receiving station device in accordance with a fourth embodiment.

FIG. 10 is a block diagram showing a functional configuration of a receiving function provided in the terminal station device 220 shown in the above-described second embodiment.

As shown in the figure, the terminal station device 220 is provided with a transmitting section 221, a receiving section 222, a control section 223, and an antenna 124. In FIG. 10, the same configurations as those of FIG. 6 are denoted by the same reference symbols. Hereinafter, configurations different from those of FIG. 6 will be described.

In the terminal station device 220, the receiving section 222 is provided with a receiving processing section 222b, an interference information extracting section 222c, a filter control section 222d, a filter 222e, a demodulating section 222f, a deinterleaver 222g, and an FEC decoding section 222h.

The receiving processing section 222b down-converts a received signal, and performs analog/digital conversion.

The interference information extracting section 222c performs interference information extraction processing of extracting, from the received signal, interference information including a center frequency of an interference signal, a frequency bandwidth of the interference signal, and reception power of the interference signal based on desired signal information which is determined at the initiation of communication with the base station device 210. It is possible to perform the interference information extraction processing by the existing technology. For example, the interference information extracting section 222c calculates a frequency spectrum of the received signal by performing a fast Fourier transform (FFT) on the received signal, estimates a frequency spectrum of the interference signal by calculating the difference between the calculated frequency spectrum of the received signal and the estimated result of a frequency spectrum of a desired signal obtained based on the desired signal information, and extracts the interference information based on the estimated result. Moreover, for example, the interference information extracting section 222c may extract the interference information based on a frequency spectrum of a signal in which no power is allocated to subcarriers which is transmitted from the base station device 210 at a predetermined timing.

The filter control section 222d stores the desired signal information at the initiation of communication with the base station device 210, determines filter parameters satisfying the following two conditions based on the desired signal information and the interference information extracted by the interference information extracting section 222c, and sets the determined filter parameters in the filter 222e.

(1) A received signal in a frequency band in which no interference signal is present and only a desired signal is present is passed through.

(2) A received signal in a frequency band in which an interference signal is present is attenuated.

It is noted that the filter parameters are configured, for example, by a filter type and a cutoff frequency.

The filter 222e filters the received signal based on the filter having the filter parameters set by the filter control section 222d. That is, the filter 222e filters the received signal, which has been referred to by the filter control section 222d upon determination of the filter parameters, based on the filter having the filter parameters set by the filter control section 222d.

The demodulating section 222f generates a demodulated signal by removing a guard interval from the received signal filtered by the filter 222e and by performing FFT and demodulation.

The deinterleaver 222g deinterleaves the demodulated signal generated by the demodulating section 222f.

The FEC decoding section 222h decodes the demodulated signal deinterleaved by the deinterleaver 222g in accordance with forward error collection (FEC), generates a bit sequence in which an error bit has been corrected, and outputs received data. Furthermore, when the decoding is performed in accordance with FEC and the bit sequence in which the error bit has been corrected is generated, the FEC decoding section 222h calculates an error rate.

The control information adding device 223a generates transmission information representing the filter parameters determined by the filter control section 222d and the error rate of the received data calculated by the FEC decoding section 222h. Subsequently, the transmission baseband signal generator 221a in the transmitting section 221 generates a transmission information signal by executing, on the generated transmission information, processing such as coding processing, modulation processing, digital/analog conversion processing, up-conversion processing, and transmits the generated transmission information signal to the base station device 210 via the antenna 124.

Next, the details of an operation of the filter control section 222d will be described. The filter control section 222d calculates a relative position between a desired signal and an interference signal based on desired signal information and interference information, and determines filter parameters to be applied to the filter 222e in accordance with the calculated result. Specifically, the filter control section 222d selects a filter type to be applied to the filter 222e from among a high-pass filter, a low-pass filter, and a notch filter based on the desired signal information and the interference information. Furthermore, the filter control section 222d determines a cutoff frequency of the filter. Then, the filter control section 222d controls the filter 222e in accordance with the determined filter type and cutoff frequency.

Hereinafter, the details of filter control processing will be described with reference to the drawings.

Figure 11A:
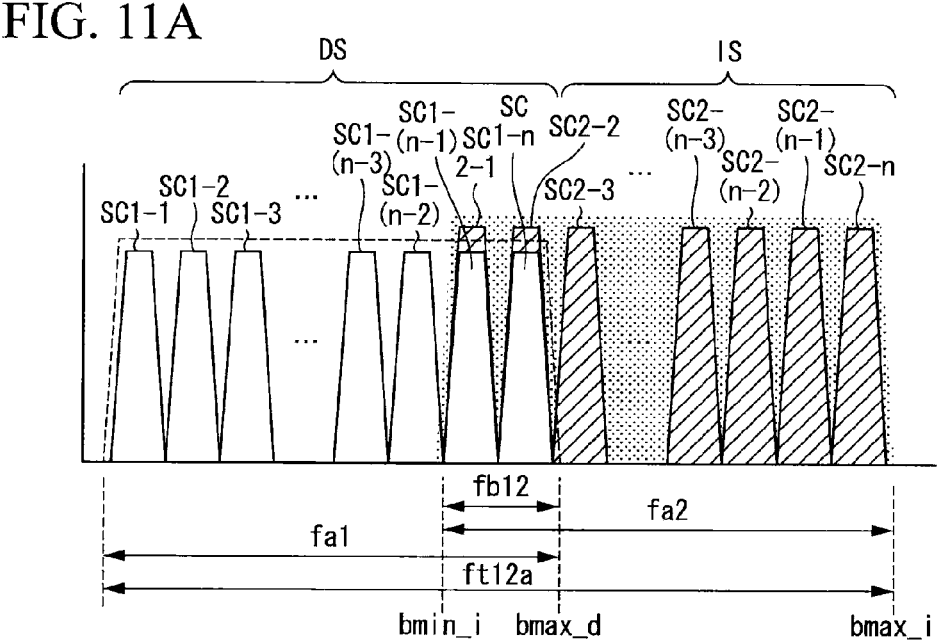
FIG. 11A is a diagram showing an operation of the receiving station device in accordance with the fourth embodiment.
Figure 11B:
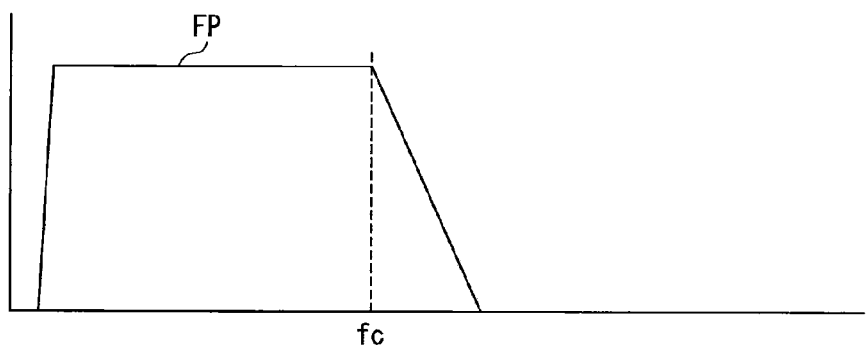
FIG. 11B is a diagram showing an operation of the receiving station device in accordance with the fourth embodiment.
Figure 11C:
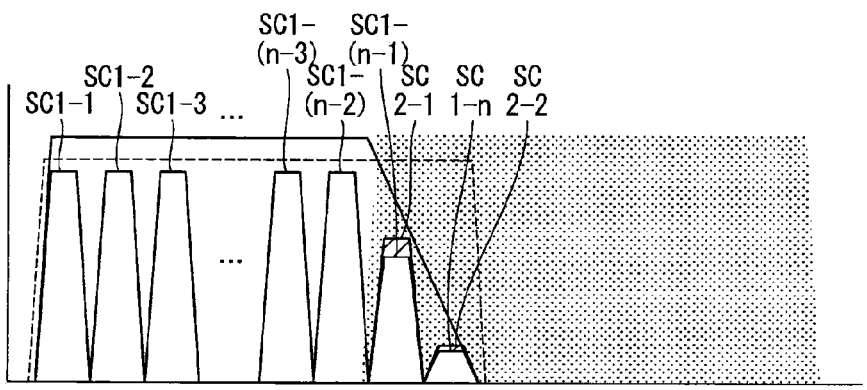
FIG. 11C is a diagram showing an operation of the receiving station device in accordance with the fourth embodiment.

FIGS. 11A to 11C are schematic diagrams showing an overview of filter control processing when the filter control section 222d sets the low-pass filter as the filter 222e. FIG. 11A is a schematic diagram showing a frequency spectrum of a received signal received by the antenna 124 divided into a frequency spectrum of a desired signal and a spectrum of an interference signal. In FIG. 11A, the vertical axis represents power, the horizontal axis represents frequency, a reference symbol DS denotes the frequency spectrum of the desired signal, and a reference symbol IS denotes the frequency spectrum of the interference signal. The filter control section 222d calculates a maximum value (bmax_i) of a frequency band of the interference signal based on a center frequency and a frequency bandwidth of the interference signal, calculates a maximum value (bmax_d) of a frequency band of the desired signal based on a center frequency and a frequency bandwidth of the desired signal, and applies the low-pass filter to the filter 222e if bmax_i is higher than bmax_d (FIG. 11A).

FIG. 11B is a schematic diagram showing an overview of the low-pass filter applied to the filter 222e by the filter control section 222d. In FIG. 11B, the vertical axis represents a gain (in units of dB) and the horizontal axis represents frequency (in units of Hz). In this case, the filter control section 222d calculates a minimum value (bmin_i) of a frequency band of an interference signal based on a center frequency and a frequency bandwidth of the interference signal, and determines the value of a cutoff frequency (a frequency at which a gain of the low-pass filter becomes −3 dB) fc of the low-pass filter as bmin_i. Then, the filter control section 222d sets filter parameters in which the filter type is the low-pass filter and the cutoff frequency fc is bmin_i in the filter 222e as indicated by a reference symbol FP.

FIG. 11C shows a result of filter processing performed on a signal of FIG. 11A using the low-pass filter having the characteristics shown in FIG. 11B. As shown in the figure, it can be seen that the interference signal is reduced by the filter processing.

The case where the low-pass filter is applied has been shown above, but it is possible to select the high-pass filter and the notch filter in view of a detected situation of the interference signal. In this case, the cutoff frequency is selected by the above-described method.

It is noted that the configuration shown in this figure can be applied not only o the above-described receiving section 222 in the terminal station device 220, but also to the receiving section 122 in the terminal station device 120 and the receiving section 112 in the base station device 110 which are shown in the first embodiment, the receiving section 212 in the base station device 210, the receiving section 312 in the base station device 310, and the like.

In accordance with the spectrum arrangement methods by the above-described embodiments, a control station, which determines a spectrum arrangement, can arrange spectra when three or more communication systems respectively including a transmitting station and a receiving station which transmit and receive a multicarrier signal using a spectrum including a plurality of subcarriers, simultaneously perform communication. The base station devices 110, 210, and 310 defined as transmitting stations transmit multicarrier signals using spectra allocated to their own systems. The terminal station devices 120 and 220 defined as receiving stations pre-recognize bands in spectra arranged for their own systems which are superposed on those of the communication systems 700, 800, and the like, which are other systems. The terminal station devices 120 and 220 receive multicarrier signals addressed to their own stations by applying interference suppressing technology to the superposed bands and error-correction decoding signals to which the interference suppressing technology is applied. Spectra are arranged so that superposed rates of the respective spectra, each derived from a spectral bandwidth and a predetermined superposed bandwidth which is superposed on another spectrum, are the same as each other.

In this way, by arranging the spectra so that the superposed rates of the respective spectra are the same as each other, it is possible to provide a frequency arrangement method capable of reducing the influence in each spectrum due to a superposition, securing the substantial communication quality, and effectively utilizing frequencies.

Moreover, the spectral bandwidth is variable in each communication system, and in a spectrum arrangement step, spectra are arranged so that the superposed rates of the respective spectra are the same as each other by arranging spectra having a narrow spectral bandwidth at ends of a used frequency band and by arranging a spectrum having a wide spectral bandwidth in the middle of the used frequency band.

With such an arrangement, it is possible to secure a predetermined band even in a spectrum having a narrow bandwidth and improve the total transfer efficiency by arranging spectra so that the superposed rates of the respective spectra are the same as each other.

Additionally, the terminal station devices 120 and 220 perform interference suppression processing by removing a recognized superposed band using a frequency filter.

Thereby, it is possible to remove a band including an interference wave and suppress the interference wave in a received signal.

Moreover, the terminal station devices 120 and 220 mask a likelihood of the received signal in the recognized superposed band (corresponding to the above-described demodulated values of the subcarriers), and performs, in an error-correction decoding step, interference suppression processing by error-correction decoding the received signal of which the likelihood is masked, and receives a multicarrier signal addressed to their own stations.

Thereby, it is possible to remove a spectrum including an interference wave and to suppress the interference wave in the received signal.

Additionally, the spectra are arranged based on a result detected by the interference wave detecting device 222a (interference signal detecting means) provided in a receiving station such as the terminal station device 220.

Thereby, it is possible to select a spectrum suitable for a receiving environment in the receiving station and to improve the reception quality of the receiving station.

Moreover, the spectra are arranged based on a result detected by the interference signal detecting device 122a (interference signal detecting means) provided in a transmitting station such as the base station device 110.

Thereby, it is possible for the transmitting station to directly detect a surrounding receiving environment and to directly detect an interference signal without a result detected at another place being transferred, and thus it is possible to increase responsiveness so as to follow an environmental variation. In addition, it is possible to select spectra suitable for communication environments at different times and to improve the communication quality.

Additionally, the spectra are arranged based on a result detected by the interference wave detecting device 331 (interference signal detecting means) provided in the control station device 330, which is different from either of the base station device 310 (the transmitting station) and the terminal station device 320 (the receiving station).

Thereby, it is possible to select a spectrum suitable for a receiving environment in the control station device 330 and to perform centralized control of spectrum arrangements of its own communication system (the communication system 300) and other communication systems (the communication systems 700c and 800c) based on information detected by the control station device 330.

It is noted that the present invention is not limited to the above-described embodiments, and changes can be made without departing from the gist of the present invention. All types of coding schemes can be used as a coding scheme in a receiving method of the present invention, and the number of receiving devices and a connection type are not limited to particular ones.

Additionally, the interference wave detecting devices 112a and 222a shown in the above-described embodiments may be provided as an interference-signal detecting function dedicated to a frequency arrangement, and they may be used also for an interference-signal detecting function intended for reproducing reception information from a received signal.

Moreover, the above description shows embodiments in which the transmitting section 111 controls a band in order to further improve the frequency utilization efficiency. An advantageous effect that the frequency utilization efficiency is improved can be obtained by performing the band control, but transmission may be performed in a determined band without performing the band control.

It is noted that the communication system of the present invention corresponds to the communication systems 100, 200, and 300. Also, the transmitting station device of the present invention corresponds to the base station devices 110, 210, and 310. Also, the receiving station device of the present invention corresponds to the terminal station devices 120, 220, and 320. Also, the control station device of the present invention corresponds to the control station device 330. Also, the interference signal detecting section of the present invention corresponds to the interference wave detecting devices 112a, 222a, and 331. Also, the spectrum arranging section of the present invention corresponds to the frequency allocating devices 113a and 332. Also, the spectrum allocating section of the present invention corresponds to the frequency allocating devices 113a and 332. Also, the control information distributing section of the present invention corresponds to the control information distributing device 333. Also, the control information transmitting section of the present invention corresponds to the control information adding device 223a. Also, the transmitting section of the present invention corresponds to the transmitting sections 111 and 311. Also, the receiving section of the present invention corresponds to the receiving sections 122 and 222.

Moreover, the control step of the present invention corresponds to a processing step by the control section 113. Also, the transmitting step of the present invention corresponds to processing steps by the transmitting sections 111 and 311. Also, the superposed band recognizing step of the present invention corresponds to processing steps by the interference wave detecting devices 112a, 222a, and 331. Also, the interference suppressing step of the present invention corresponds to processing steps by the receiving sections 120 and 220. Also, the error-correction decoding step of the present invention corresponds to processing steps by the receiving sections 122 and 212. Also, the spectrum arranging step of the present invention corresponds to processing steps by the frequency allocating devices 113a and 332. Also, the spectrum allocating step of the present invention corresponds to processing steps by the frequency allocating devices 113a and 332.

Hereinafter, a fifth embodiment of the present invention will be described with reference to the drawings.

Figure 12:
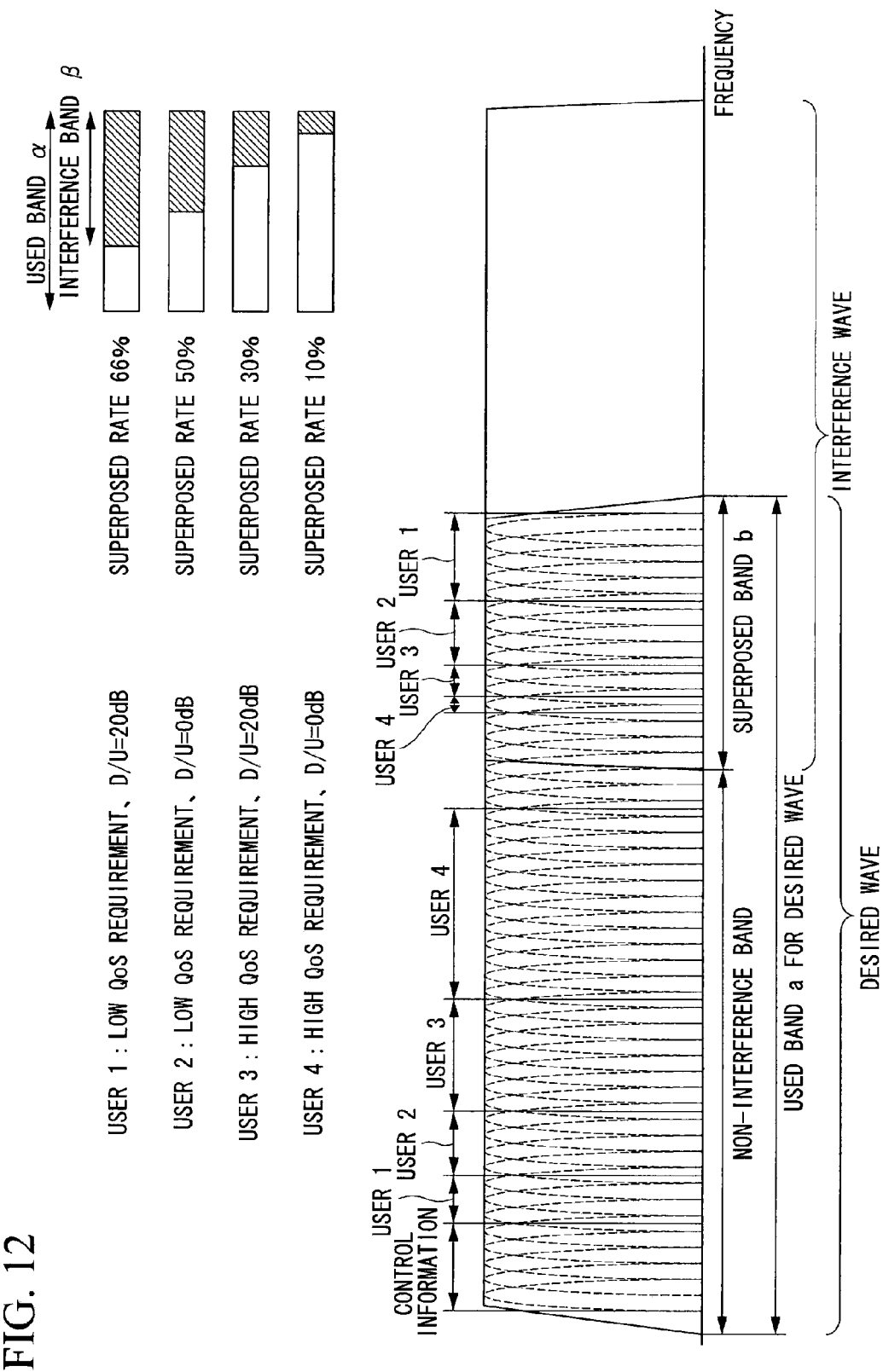
FIG. 12 is a diagram showing an overview of an operation of a signal transmitting device in accordance with a fifth embodiment of the present invention.

FIG. 12 shows an overview of an operation of a signal transmitting device (transmitting station device) in accordance with the fifth embodiment of the present invention. The signal transmitting device in accordance with the present embodiment transmits a multicarrier signal of orthogonal frequency-division multiplexing (OFDM) or the like, and uses a forward error correction (FEC) code as an error correction code. This signal transmitting device sequentially allocates a plurality of FEC blocks to each channel in the frequency domain and transmits them. At this time, the signal transmitting device performs scheduling which assigns a superposed rate (a rate in which a superposed band in which interference is occurring is used in a frequency band used for signal transmission) corresponding to a service quality requirement of each user, that is, a QoS, to each FEC block using a subcarrier allocation method or a subcarrier interleaver which varies the superposed rate. That is, high-QoS user data is transmitted at a low superposed rate by allocating many non-interference bands, and low-QoS user data is transmitted at a high superposed rate by allocating many superposed bands. It is noted that control information is transmitted using only a non-interference band. Thereby, the loss of control information and high-priority data is prevented. In addition, a superposed rate may be allocated to each user in accordance with a reception state of user data. That is, while many superposed bands are allocated to user data of which a reception state is good and the user data is transmitted at a high superposed rate, many non-interference bands are allocated to user data of which a reception state is bad and the user data is transmitted at a low superposed rate. Thereby, the advantageous effect of improving the frequency utilization efficiency of all channels is enhanced.

As shown in FIG. 12, the reception state is represented by a desired-to-undesired signal ratio (D/U ratio). In addition, it is assumed that a QoS requirement is low and D/U=20 dB with respect to a user 1, a QoS requirement is low and D/U=0 dB with respect to a user 2, a QoS requirement is high and D/U=20 dB with respect to a user 3, and a QoS requirement is high and D/U=0 dB with respect to a user 4.

When a frequency band used to transmit data for a certain user is α and an interference band in the used frequency band is β, a superposed rate of the user=β/α. At this time, superposed rates of the users 1, 2, 3, and 4 are determined as 66%, 50%, 30%, and 10%, respectively. In addition, the superposed rate for all the users is set so as to be equal to a superposed rate of a desired wave=(superposed band "b" of desired wave)/(used band "a" of desired wave).

Figure 13:
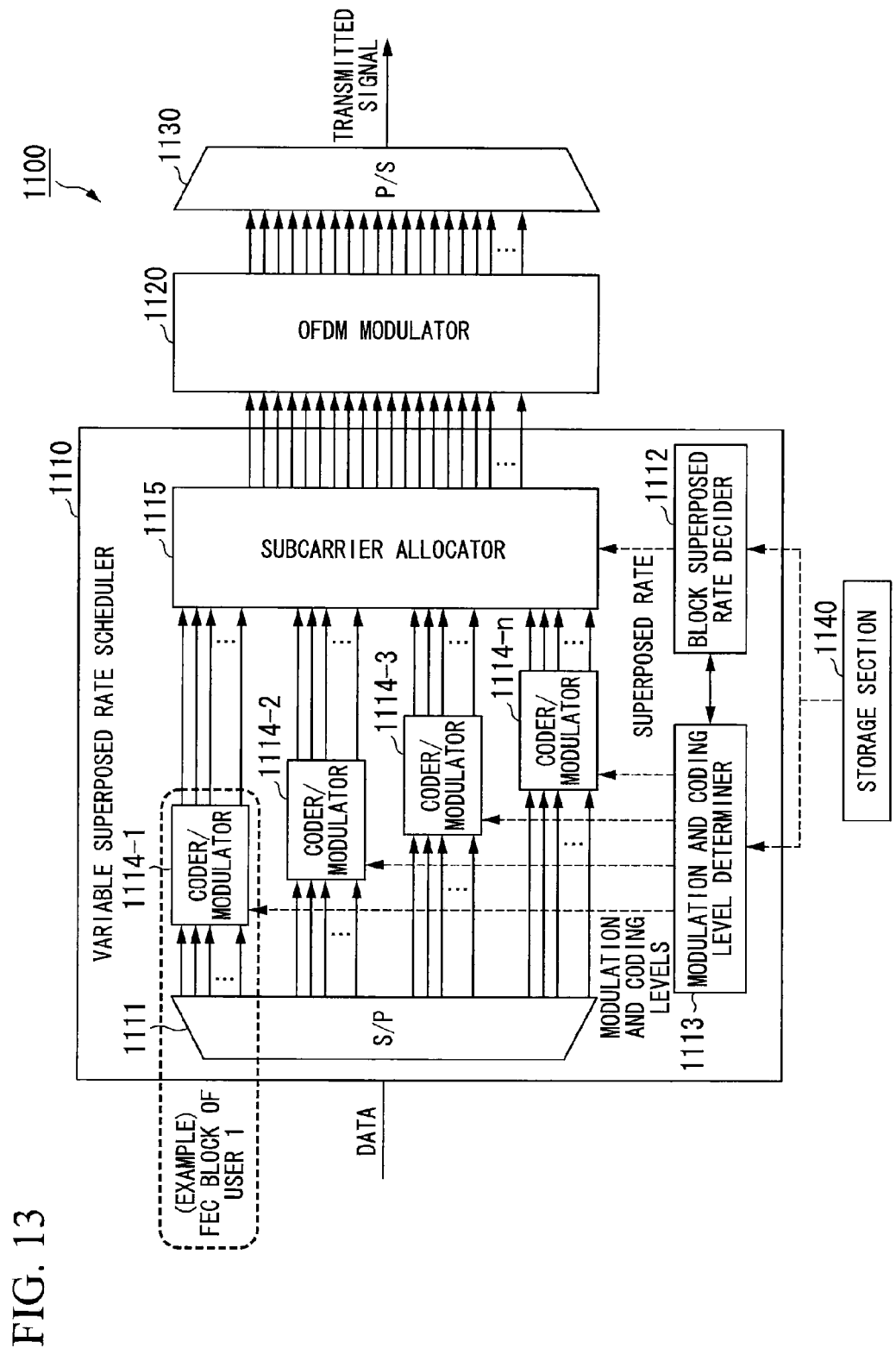
FIG. 13 is a block diagram showing a configuration of the signal transmitting device in accordance with the fifth embodiment.

FIG. 13 is a block diagram showing a configuration of a signal transmitting device 1100 in accordance with the present embodiment.

In the figure, the signal transmitting device 1100 is provided with a variable superposed rate scheduler 1110, an OFDM modulator 1120, a parallel/serial converter (P/S converter) 1130, and a storage section 1140.

The storage section 1140 stores a QoS of each user, the reception quality upon receipt from a signal receiving device (receiving station device), and an SINR value estimated upon receipt of a signal from the signal receiving device. In addition, the storage section 1140 stores minimum SINR (signal-to-noise ratio; SN ratio) values capable of satisfying the required communication quality (a bit error rate, a frame error rate, or the like) on the assumption of an aerial transmission path which are calculated at respective modulation and coding levels for respective variable superposed rates as a modulation and coding level table.

The variable superposed rate scheduler 1110 is provided with a serial/parallel converter (S/P converter) 1111, a block superposed rate decider 1112, a modulation and coding level determiner 1113, coders/modulators 1114-1 to 1114-n, and a subcarrier allocator 1115.

The S/P converter 1111 converts a serial signal of transmission data into parallel signals, and outputs signals of respective users to the coders/modulators 1114-1 to 1114-n for the respective users. The block superposed rate decider 1112 determines superposed rates based on the QoS of the respective users and the reception quality of the signal receiving device that receives data of the respective users, which are stored in the storage section 1140. The modulation and coding level determiner 1113 determines modulation and coding levels from the superposed rates determined by the block superposed rate decider 1112 and an estimated SINR value corresponding to the signal receiving device, which is a transmission destination of the data of the respective users, stored in the storage section 1140, by referring to the modulation and coding level table stored in the storage section 1140. The coders/modulators 1114-1 to 1114-n code the data from the users using FEC codes in accordance with the modulation and coding levels of the respective users determined by the modulation and coding level determiner 1113, modulate the coded data, and output the modulated data to the subcarrier allocator 1115. The subcarrier allocator 1115 allocates the modulated data to subcarriers in an interference band and subcarriers in a non-interference band in accordance with the superposed rates determined by the block superposed rate decider 1112, and outputs the allocated data to the OFDM modulator 1120 as parallel signals.

The OFDM modulator 1120 performs an inverse Fourier transform on the parallel signals allocated to the respective subcarriers by the subcarrier allocator 1115, and outputs the transformed parallel signals. The P/S converter 1130 generates an OFDM signal by performing a serial conversion on the parallel signals output from the OFDM modulator 1120, and outputs a serial signal as a transmitted signal.

Figure 14:
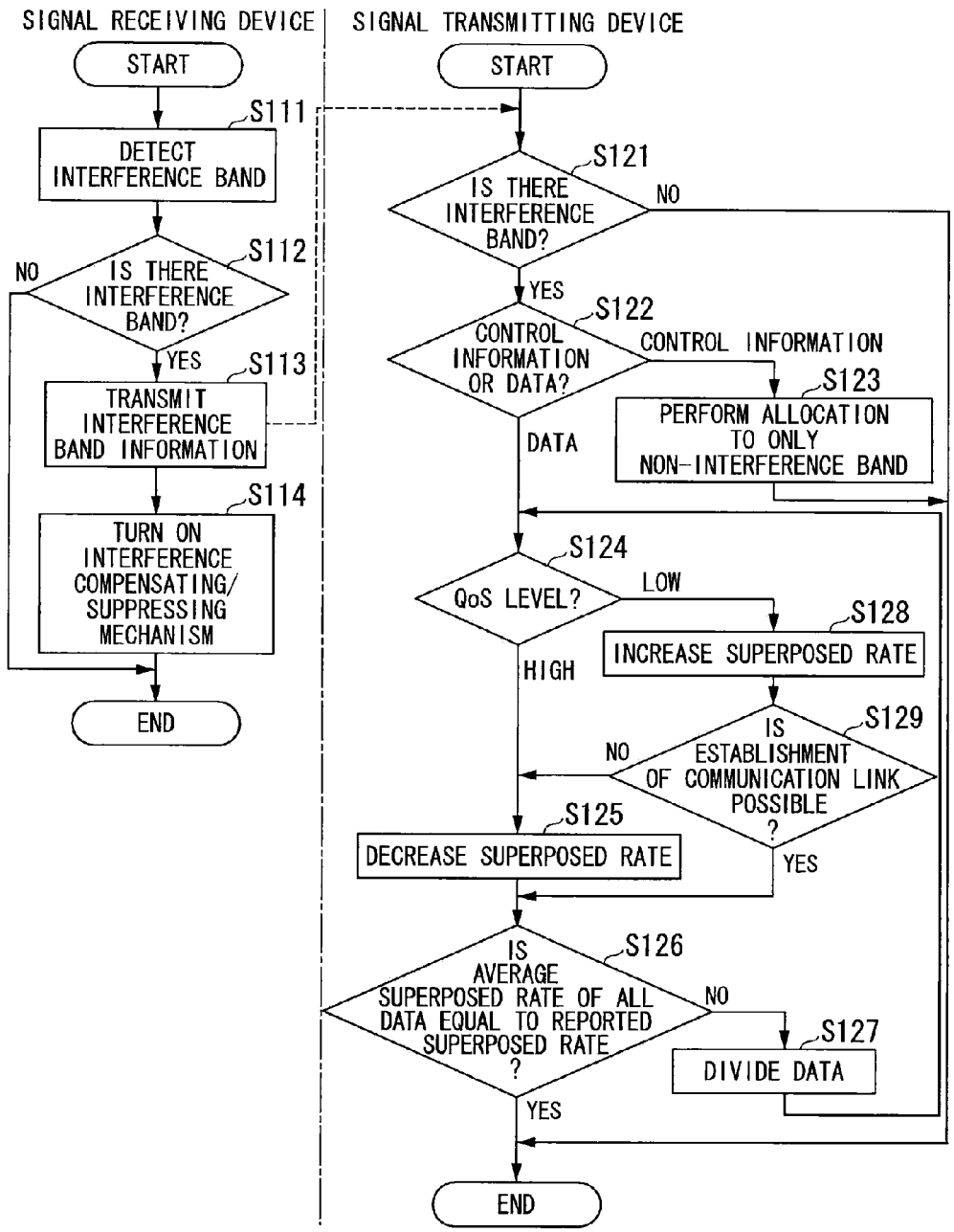
FIG. 14 is a diagram showing a flow in a communication system using the signal transmitting device shown in FIG. 13.

FIG. 14 is a diagram showing a flow in a communication system using the above-described signal transmitting device 1100.

In the figure, the signal receiving device performs detection processing of an interference band (step S111). For example, the signal receiving device transmits a request for stopping transmission of radio signals of a desired wave to the signal transmitting device 1100, and detects the presence/absence of another radio signal, signal strength, and the like for each subcarrier in the used frequency band of the desired wave in an environment where no desired wave is transmitted, thereby making it possible to detect a frequency band in which interference occurs. If the signal receiving device has not detected the interference band (step S112: NO), the processing ends.

If the interference band has been detected (step S112: YES), the signal receiving device reports information on the detected interference band to the signal transmitting device 1100 (step S113), and turns on an interference compensation/suppression mechanism (step S114). The signal transmitting device 1100 writes the information on the interference band received from the signal receiving device into the storage section 1140. Additionally, the signal transmitting device 1100 estimates an SINR from a signal received from the signal receiving device, and writes the SINR into the storage section 1140.

When transmission data is input to the variable superposed rate scheduler 1110 of the signal transmitting device 1100, the block superposed rate decider 1112 refers to the storage section 1140 and determines whether or not there is a superposed band (an interference band) (step S121). If it is determined that there is a superposed band (step S121: YES), the block superposed rate decider 1112 determines whether the transmission data is control information or user data (step S122).

If the transmission data is control information (step S122: control information), the block superposed rate decider 1112 determines that 0 should be set in the superposed rate, and outputs the superposed rate to the modulation and coding level determiner 1113 and the subcarrier allocator 1115. The modulation and coding level determiner 1113 refers to the modulation and coding level table stored in the storage section 1140 using the superposed rate determined by the block superposed rate decider 1112 and the estimated SINR values stored in the storage section 1140, and determines a modulation and coding level. A coder/modulator 1114-i (i=1 to n), to which the transmission data, which is control information, is input, codes and modulates the data in accordance with the modulation and coding level determined by the modulation and coding level determiner 1113. In addition, the subcarrier allocator 1115 allocates all the coded data of the control information to subcarriers in a non-interference band, and outputs the allocated data to the OFDM modulator 1120 (step S123).

If the transmission data is user data (step S122: data), the block superposed rate decider 1112 reads the QoS of each user from the storage section 1140, and determines whether a QoS level is higher or lower than a predetermined service quality level. If the QoS level is higher than the predetermined service quality level (step S124: high), the block superposed rate decider 1112 determines the superposed rate of each user so as to be lower than the superposed rate of the desired wave (step S125). The modulation and coding level determiner 1113 refers to the modulation and coding level table stored in the storage section 1140 using the superposed rate determined by the block superposed rate decider 1112 and the estimated SINR values stored in the storage section 1140, and determines a modulation and coding level of each user.

Subsequently, the block superposed rate decider 1112 determines whether an average superposed rate of all data is equal to the superposed rate of the desired wave calculated from the information on the interference band received in step S121 (step S126). If the average superposed rate of all the data is equal to the superposed rate of the desired wave (step S126: YES), the coders/modulators 1114-$i$ ($i$=1 to n), to which the user data is input, perform coding and modulation in accordance with the modulation and coding levels determined by the modulation and coding level determiner 1113, and the subcarrier allocator 1115 allocates the coded data of the users to subcarriers of the interference region and subcarriers in the non-interference band in accordance with the superposed rates of the respective users determined by the block superposed rate decider 1112.

In step S126, if the average superposed rate of all the data is different from the superposed rate of the desired wave (step S126: NO), the coders/modulators 1114-$i$ ($i$=1 to n), to which the user data is input, divide the input transmission data (step S127), and repeat the processing from step S124. That is, since data having a size exceeding a capacity capable of being transferred at the given superposed rate cannot be transferred, the user data is divided into a plurality of blocks. Subsequently, an amount of data to be transmitted in one symbol is adjusted by scheduling for reallocating all data that cannot be transferred to a subsequent symbol or by shortening an FEC block length.

Additionally, in step S124, if the QoS level is lower than the predetermined service quality level (step S124: low), the block superposed rate decider 1112 determines the superposed rate of each user so as to be higher than the superposed rate of the desired wave (step S128). The modulation and coding level determiner 1113 refers to the modulation and coding level table stored in the storage section 1140 using the superposed rate determined by the block superposed rate decider 1112 and the estimated SINR values stored in the storage section 1140, and determines a modulation and coding level of each user.

The signal transmission device 1100 determines whether or not the establishment of a communication link with the signal receiving device is possible by determining whether the modulation and coding level can be selected in step S128 (step S129). That is, the signal transmitting device 1100 refers to the modulation and coding level table and determines that the communication link cannot be established at a superposed rate for which there is no modulation and coding level satisfying the required communication quality. If the establishment of the communication link is possible (step S129: YES), the processing is executed from step S126, in which it is determined whether or not the average superposed rate of all the data is different from the superposed rate of the desired wave. In contrast, if the establishment of the communication link is not possible (step S129: NO), the processing is executed from step S125, in which the superposed rate is decreased.

Next, the details of superposed rate setting processing of the signal transmitting device 1100 will be described.

The S/P converter 1111 of the signal transmitting device 1100 determines users which correspond to respective pieces of transmission data using control data attached to the transmission data or control data received from a control section (not shown), and outputs the transmission data to the coders/modulators 1114-1 to 1114-$n$ for the respective users. For example, the S/P converter 1111 outputs data of the user 1 to the coder/modulator 1114-1, outputs data of the user 2 to the coder/modulator 1114-2, outputs data of the user 3 to the coder/modulator 1114-3, and outputs data of the user 4 to the coder/modulator 1114-4.

The block superposed rate decider 1112 determines superposed rates of coded data of the respective users.

Figure 15:
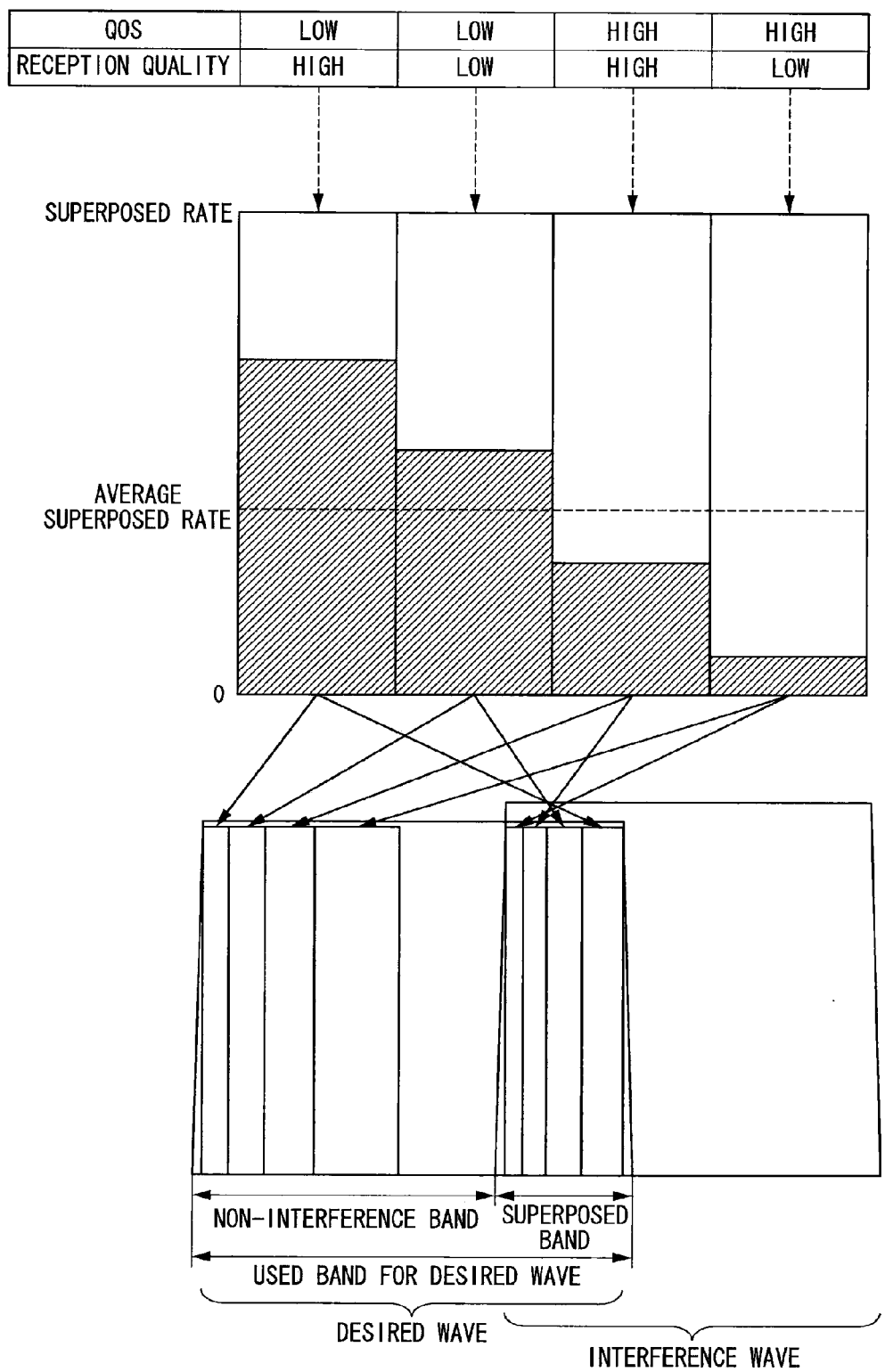
FIG. 15 is a diagram showing a relationship between a superposed rate and a combination of a QoS and the reception quality in accordance with the fifth embodiment.

FIG. 15 is a diagram showing a relationship between a superposed rate and a combination of a QoS and the reception quality. In terms of QoS, there are three steps of the high quality for a control signal, the high quality for user data, and the low quality for user data. In the case of the control signal, 0 is set in the superposed rate and all coded data is transmitted in a non-interference band. Thus, in the figure, only the high and low qualities of the user data are shown. For example, a desired-to-undesired signal ratio (D/U), a signal-to-noise ratio (S/N), a carrier-to-interference ratio (C/I), or the like can be used as the reception quality, and the reception quality is divided into two steps of a high level and a low level by comparing the value of D/U, S/N, or C/I of each user with a predetermined threshold. It is noted that information on D/U, S/N, or C/I is usually reported from the signal receiving device via an uplink, as information requested by a user.

In the figure, when a requested service quality is the low quality, that is, when a QoS is low, a superposed rate is set so as to be higher than an average superposed rate of all the users. Moreover, when the requested service quality is the high quality, that is, when a QoS is high, the superposed rate is set so as to be lower than the average superposed rate of all the users. Furthermore, when the reception quality is high, the superposed rate is set so as to be higher than that when the reception quality is low. That is, (superposed rate when a QoS is low and reception quality is high)>(superposed rate when a QoS is low and reception quality is low)>(average superposed rate of all users)>(superposed rate when a QoS is high and reception quality is high)>(superposed rate when a QoS is high and reception quality is low).

> It is noted that average superposed rate of all users=superposed rate of desired wave=(superposed band of desired wave)/(used band of desired wave).

The modulation and coding level determiner 1113 refers to the modulation and coding level table stored in the storage section 1140 using the superposed rates determined by the block superposed rate decider 1112 and the SINR values stored in the storage section 1140 estimated for signal receiving devices, which are transmission destinations of user data, and selects a modulation and coding level that provides a maximum transfer bit amount among modulation and coding levels which satisfy the required communication quality.

It is noted that the modulation and coding level is represented by a modulation scheme and a coding rate. An example of the modulation scheme is 16 quadrature amplitude modulation (QAM), 64QAM, quadrature phase shift keying (QPSK), or the like. In addition, the coding rate is obtained by (the number of bits before coding)/(the number of bits after coding). Accordingly, the modulation and coding level is represented as QPSK ½, 16QAM ¾, or the like.

Each of the coders/modulators 1114-1 to 1114-n codes its own input data of a user using FEC in accordance with the modulation and coding level of the user set by the modulation and coding level determiner 1113, and modulates the coded data. In accordance with the above-described example, the coder/modulator 1114-1 performs coding and modulation based on a modulation and coding level of the user 1, the coder/modulator 1114-2 performs coding and modulation based on a modulation and coding level of the user 2, the coder/modulator 1114-3 performs coding and modulation based on a modulation and coding level of the user 3, and the coder/modulator 1114-4 performs coding and modulation based on a modulation and coding level of the user 4.

The subcarrier allocator 1115 allocates subcarriers to the modulated data of each user in accordance with the superposed rate of each user determined by the block superposed rate decider 1112, and outputs parallel signals to the OFDM modulator 1120. The OFDM modulator 1120 performs an inverse Fourier transform on the parallel signals allocated to the respective subcarriers by the subcarrier allocator 1115, and outputs the transformed parallel signals. The P/S converter 1130 generates an OFDM signal by performing serial conversion on the parallel signals output from the OFDM modulator 1120, and outputs it as a transmitted signal.

Figure 16A:
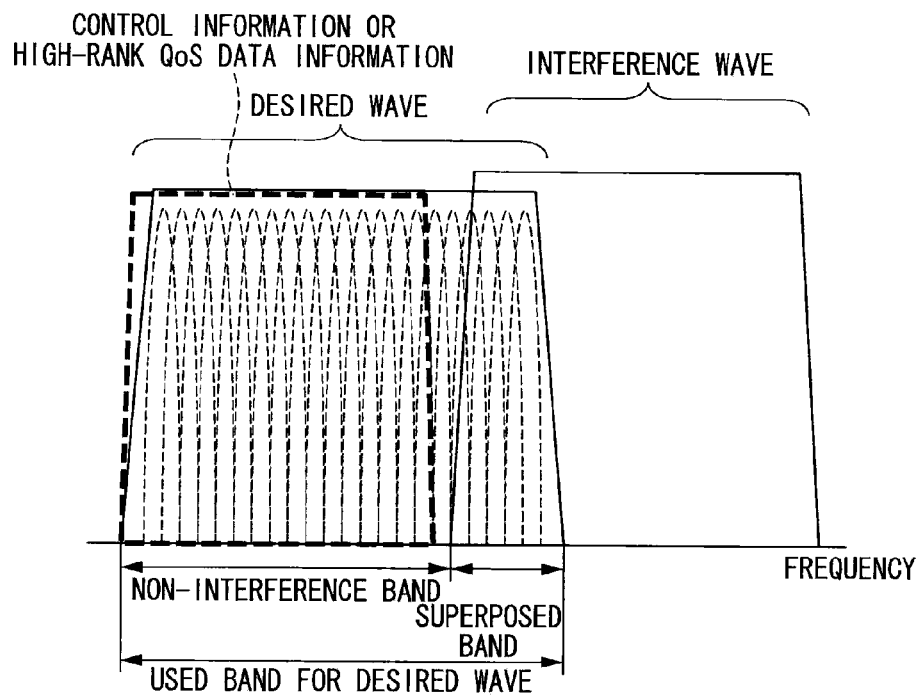
FIG. 16A is a diagram showing scheduling when only one coder/modulator is used.
Figure 16B:
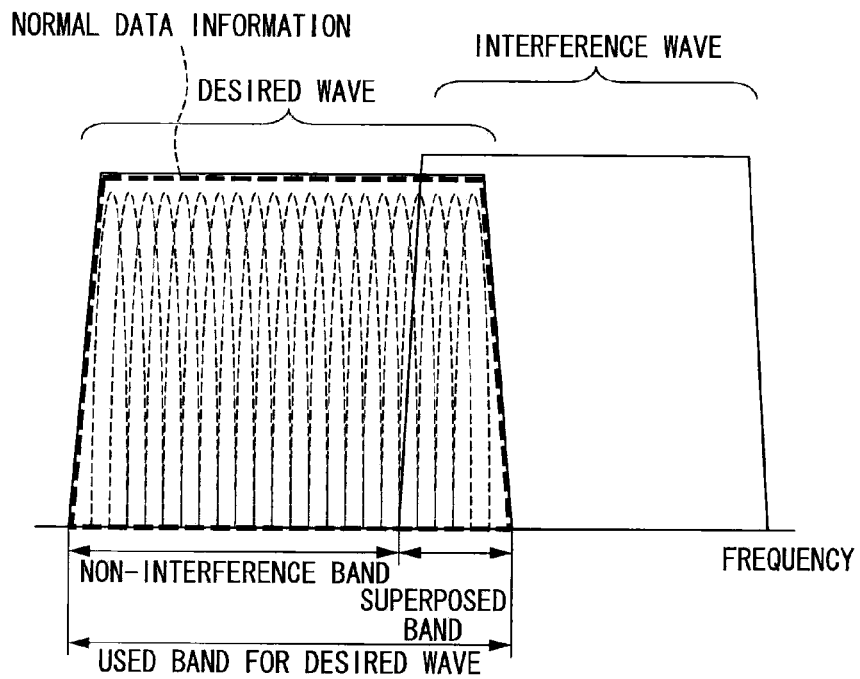
FIG. 16B is a diagram showing scheduling when only one coder/modulator is used.

It is noted that the signal transmitting device 1100 of FIG. 13 is provided with the plurality of coders/modulators 1114-1 to 1114-n, but it may be provided with only one coder/modulator. In this case, as shown in FIG. 16A, with respect to control information and transmission data requiring a high-rank QoS, the signal transmitting device 1100 allocates resources only to a non-interference band by utilizing a consecutive subcarrier allocation method. In contrast, as shown in FIG. 16B, with respect to the other transmission data, the signal transmitting device 1100 performs scheduling for allocating resources so as to be distributed to a superposed band and a non-interference band by utilizing a distributed subcarrier allocation method. Thereby, the loss of control information and high-priority data is prevented.

Hereinafter, as examples of the signal receiving device, a signal receiving device that masks an interference region and a signal receiving device that performs filtering will be described.

Figure 17:
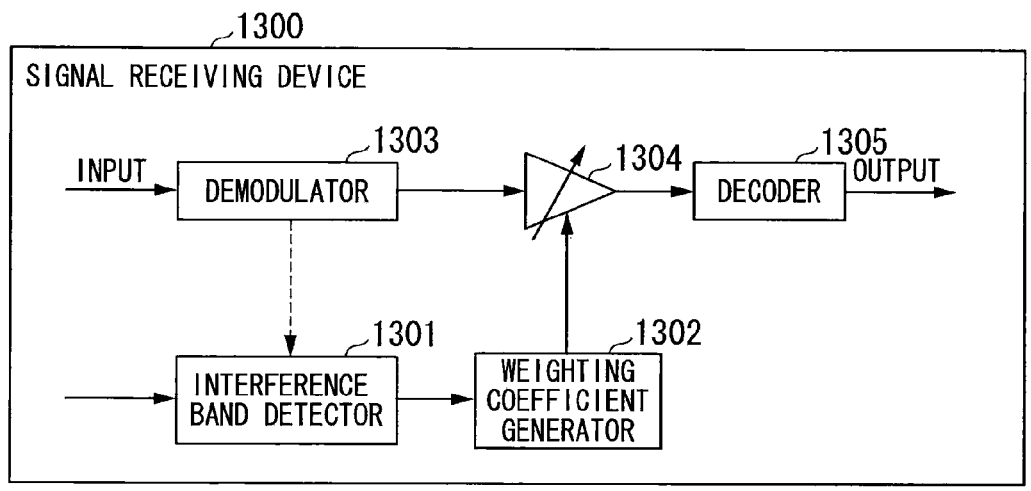
FIG. 17 is a block diagram showing an internal configuration of a signal receiving device that masks an interference band.

FIG. 17 is a schematic block diagram showing a configuration of a signal receiving device 1300 that masks the interference region.

The signal receiving device 1300 is provided with an interference band detector 1301, a weighting coefficient generator 1302, a demodulator 1303, a weighting calculator 1304, and a decoder 1305, and extracts a signal included in a desired wave which has been subjected to error correction coding from a received signal including the desired wave and an interference wave. It is noted that a connection between the interference band detector 1301 and the demodulator 1303 is not essential. For example, when the station establishment of the signal receiving device 1300 for fixed wireless access (FWA) or the like is performed, the interference band detector 1301 detects a frequency band in which interference occurs due to a radio signal transmitted from another system in a used frequency band of the desired wave of its own device. For example, the interference band detector 1301 transmits a request for stopping transmission of radio signals of the desired wave to a source wireless station of the desired wave, and detects the presence/absence of another radio signal, the signal strength, and the like for each subcarrier in the used frequency band of the desired wave in an environment where no desired wave is transmitted, thereby detecting a subcarrier in which interference occurs. For example, the interference band detector 1301 generates a sequence of specific subcarrier decision values as a sequence of interference band decision values in which "1" is associated with a specific subcarrier and "0" is associated with a subcarrier other than the specific subcarrier. The interference band detector 1301 outputs the detected result to the weighting coefficient generator 1302.

The weighting coefficient generator 1302 calculates a weighting coefficient for each subcarrier in accordance with a specific subcarrier decision value. The weighting coefficient calculated by the weighting coefficient generator 1302 is a weighting coefficient for reducing the reliability of a subcarrier in which interference occurs detected by the interference band detector 1301, compared to those of the other subcarriers. The weighting coefficient generator 1302 outputs a sequence in which the calculated weighting coefficients are arranged for respective subcarriers to the weighting calculator 1304.

The demodulator 1303 converts a received radio signal including a desired wave that has been subjected to error-correction coding into an electric signal for respective subcarriers, and outputs a demodulated value for each subcarrier to the weighting calculator 1304.

The weighting calculator 1304 performs weighting calculation processing on the demodulated value input from the demodulator 1303 for each subcarrier based on the weighting coefficient input from the weighting coefficient generator 1302, and outputs a sequence in which the calculated results are arranged for respective subcarriers to the decoder 1305 as a likelihood data sequence.

The decoder 1305 performs error correction processing and decoding processing based on the likelihood data sequence input from the weighting calculator 1304, and acquires a signal of the desired wave.

Figure 18:
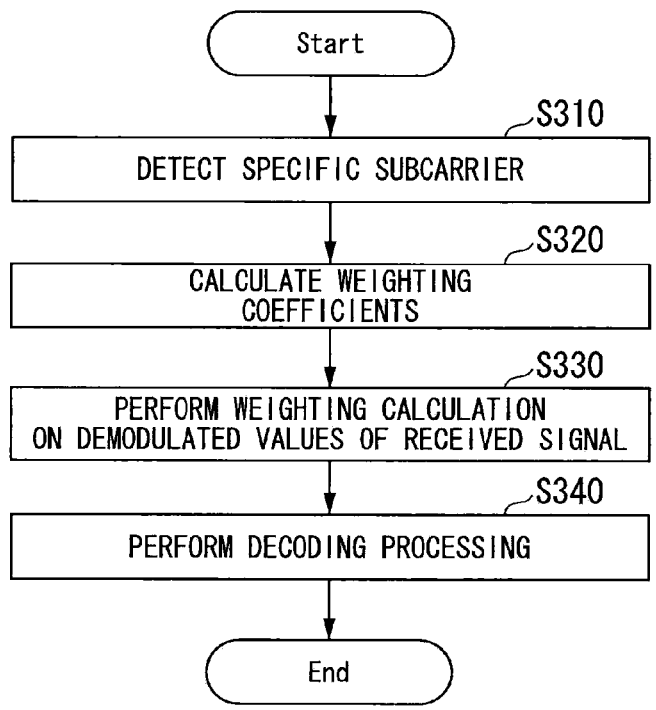
FIG. 18 is a diagram showing a flow of an operation of the signal receiving device shown in FIG. 17.

FIG. 18 is a diagram showing the processing flow of the signal receiving device 1300.

When the station establishment of the signal receiving device 1300 is performed, the interference band detector 1301 of the signal receiving device 1300 acquires information on an interference wave by measuring and detecting a reception level, a frequency band, a center frequency, a band overlapping the desired wave, and the like of a radio signal in a frequency band of each subcarrier of the desired wave at a timing that the desired wave is absent, or in a frequency band of a subcarrier in which the desired wave is absent.

Moreover, the interference band detector 1301 selects (detects) a subcarrier in which an interference wave is present as a specific subcarrier based on the acquired information on the interference wave. For example, the interference band detector 1301 detects a subcarrier in a frequency band in which a signal having a reception level higher than or equal to a predetermined value is received as a specific subcarrier based on the value of the reception level.

Figure 19A:
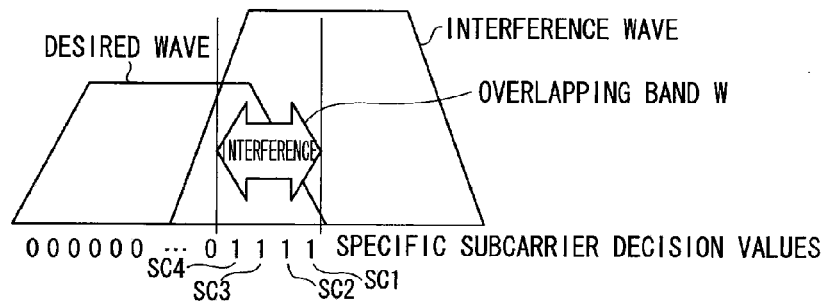
FIG. 19A is a conceptual diagram of an operation of the signal receiving device shown in FIG. 17.

FIGS. 19A to 19D are conceptual diagrams of the contents of the processing of the signal receiving device 1300. In FIG. 19A, the interference band detector 1301 detects subcarriers SC1 to SC4 included in an overlapping band W (an interference band) in which a desired wave overlaps an interference wave as specific subcarriers. The interference band detector 1301 generates a sequence of specific subcarrier decision values in which the subcarriers SC1 to SC4 are associated with "1" and the other subcarriers are associated with "0".

Referring again to FIG. 18, the interference band detector 1301 outputs the generated sequence of the specific subcarrier decision values to the weighting coefficient generator 1302 (step S310).

The weighting coefficient generator 1302 generates weighting coefficients for reducing the reliability of the specific subcarriers compared to the other subcarriers based on the specific subcarrier decision values generated by the interference band detector 1301. For example, these weighting coefficients are weighting coefficients for converting a demodulated value into a predetermined value, for example, "0", with respect to a subcarrier associated with "1" in the sequence of the specific subcarrier decision values.

The weighting coefficient generator 1302 outputs the generated sequence of the weighting coefficients for the respective subcarriers to the weighting calculator 1304 (step S320).

It is noted that the processing of steps S310 to S320 described above is performed before the signal receiving device 1300 receives a signal. Subsequently, the processing of receiving a radio signal of a desired wave will be described. The demodulator 1303 demodulates a radio signal in a frequency band of a desired wave for respective subcarriers, and outputs digital data of demodulated values for the respective subcarriers to the weighting calculator 1304.

The weighting calculator 1304 performs weighting calculation processing in accordance with a calculation method corresponding to a coding method of the desired wave based on the weighting coefficients for the respective subcarriers and the demodulated values for the respective subcarriers, and outputs a sequence of calculated results to the decoder 1305 as a likelihood data sequence (step S330).

As one example of the weighting calculation method corresponding to the coding method, an example in which the coding method of the desired wave is a soft decision positive/negative multi-valued coding method will be described with reference to FIGS. 19B to 19D. In the decoding processing corresponding to the soft decision positive/negative multi-valued coding method, a demodulated value of a received signal is a positive/negative multi-valued output, an absolute value thereof is determined as reliability (a value representing likelihood), a negative value is determined to be a value of "+1", and a positive value is determined to be a value of "−1".

Figure 19B:
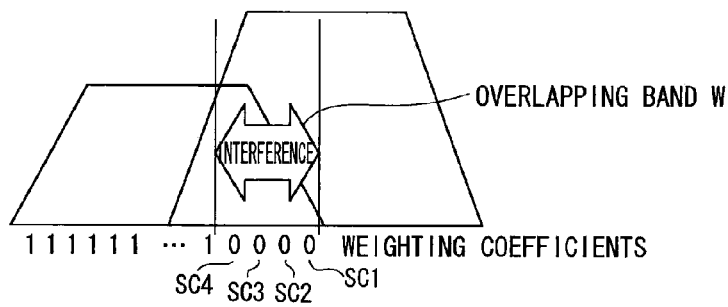
FIG. 19B is a conceptual diagram of an operation of the signal receiving device shown in FIG. 17.

FIG. 19B is a diagram showing weighting coefficients for respective subcarriers. In addition, FIG. 19C is a diagram showing demodulated values of a positive/negative multi-valued output for the respective subcarriers. In the figure, a subcarrier with the largest positive value of "+27.02" has the highest reliability that it is most likely to be "−1". On the other hand, a subcarrier with the smallest negative value of "−26.34" has the highest reliability that it is most likely to be "+1".

On the other hand, the most ambiguous one (low reliability) as to whether it is "+1" or "−1" is a subcarrier with the smallest absolute value, that is, a subcarrier with a demodulated value of 0.

Therefore, in step S320 of FIG. 18, the weighting calculator 1304 performs weighting calculation processing of converting the demodulated values of the subcarriers SC1 to SC4, which are specific subcarriers, into "0" based on the weighting coefficients calculated by the weighting coefficient generator 1302, thereby making it possible to reduce the reliability of the demodulated values of the subcarriers SC1 to SC4. Here, as shown in FIG. 19B, it is assumed that the weighting coefficient generator 1302 generates a sequence of weighting coefficients in which values obtained by performing logical negation on the specific subcarrier decision values shown in FIG. 19A are associated with the respective subcarriers.

Figure 19C:
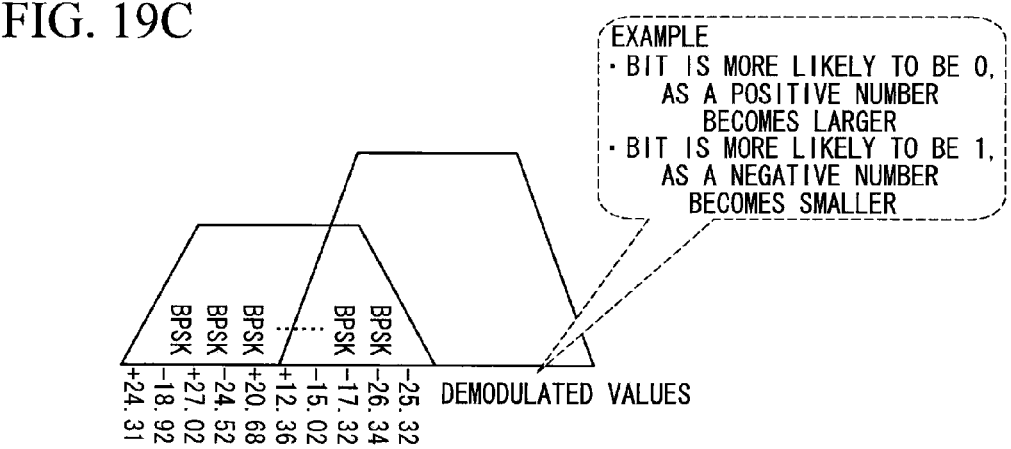
FIG. 19C is a conceptual diagram of an operation of the signal receiving device shown in FIG. 17.

As one example of the weighting calculation by the weighting calculator 1304, the weighting calculator 1304 multiplies weighting coefficients which are values obtained by performing logical negation on the specific subcarrier decision values as shown in FIG. 19B by demodulated values as shown in FIG. 19C for respective corresponding subcarriers. Specifically, the weighting calculator 1304 multiplies a demodulated value of "−25.32" by a weighting coefficient of "0" for the subcarrier SC1, which is a specific subcarrier, and outputs a multiplied result "0" to the decoder 1305 as a demodulated value subjected to the weighting calculation. Similarly, the weighting calculator 1304 multiplies the demodulated values by a weighting coefficient of "1" for subcarriers other than the specific subcarriers. The weighting calculator 1304 then outputs a sequence of multiplied results of all the subcarriers to the decoder 1305 as a likelihood data sequence.

Figure 19D:
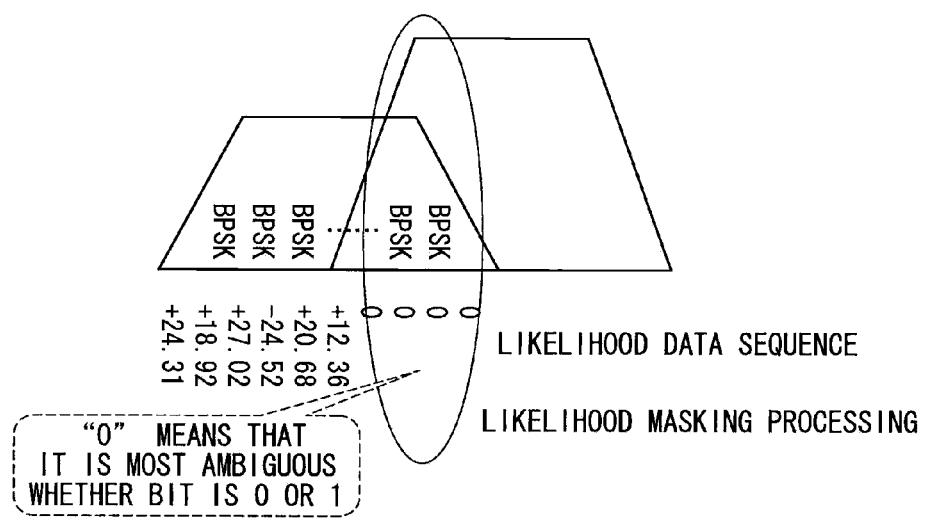
FIG. 19D is a conceptual diagram of an operation of the signal receiving device shown in FIG. 17.

FIG. 19D is a diagram showing a likelihood data sequence by the weighting calculator 1304 which performs weighting calculation for the respective subcarriers using weighting coefficients and positive/negative multi-valued demodulated values. As shown in the figure, the values of likelihood data subjected to the weighting calculation corresponding to the subcarriers SC1 to SC4, which are specific subcarriers, have a value of "0" having the lowest reliability, and the other demodulated values are not changed.

Referring again to FIG. 18, the decoder 1305 performs decoding processing corresponding to a coding method of a desired wave based on the likelihood data sequence input from the weighting calculator 1304. As an example of a coding method for error correction applied to the desired wave, convolutional coding or a method in which iterative decoding and turbo coding are combined is applicable (step S340).

In the signal receiving device 1300 described above, the interference band detector 1301 measures an interference wave in a frequency band of a desired wave upon station establishment, the weighting coefficient generator 1302 calculates weighting coefficients for reducing the reliability of specific subcarriers of a received signal in which an interference wave is present based on this measurement result, and the weighting calculator 1304 performs, on demodulated values of the received signal, processing of reducing the reliability of the specific subcarriers based on the weighting coefficients.

In this way, the signal receiving device 1300 performs a weighting calculation on demodulated values in accordance with the reliability of a received signal for respective subcarriers, masks specific subcarriers having low reliability, and decodes the received signal using the demodulated values of subcarriers having high reliability, thereby making it possible to improve the reception error correction performance.

It is noted that in the present embodiment, the example has been described in which the weighting coefficients calculated by the weighting coefficient generator 1302 are values obtained by performing logical negation on binary specific subcarrier decision values by the interference band detector 1301, that is, a bit mask. However, they are not limited to such values, and the following coefficients may be used.

Figure 20A:
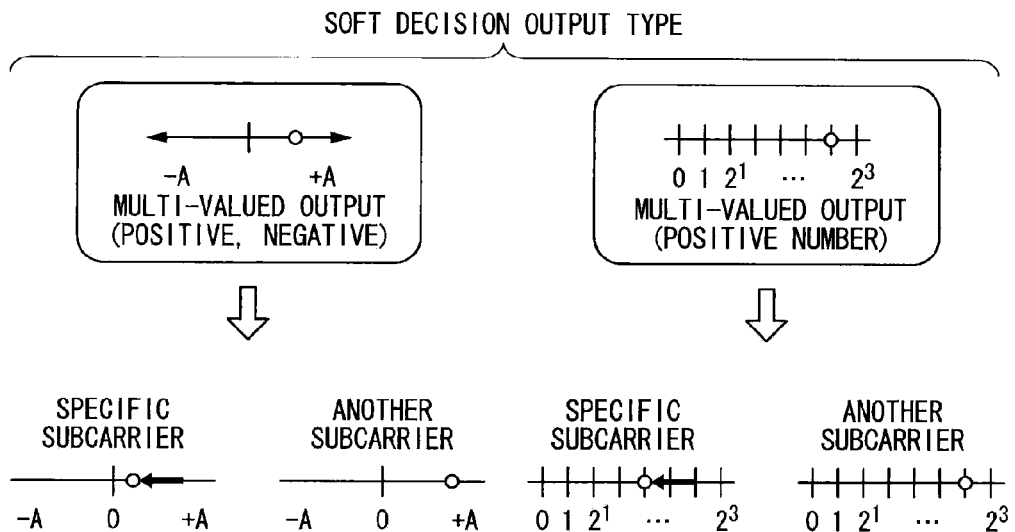
FIG. 20A is a diagram showing an example of another weighting.
Figure 20B:
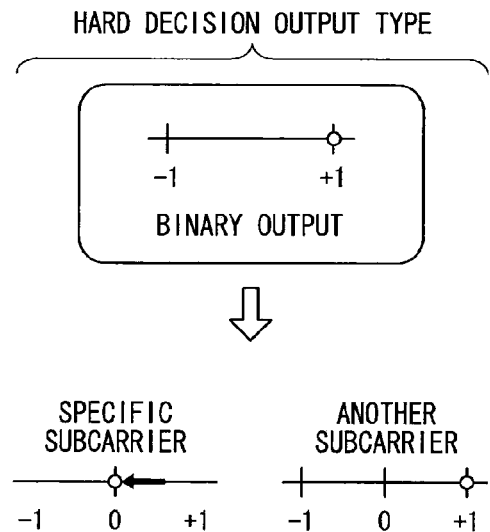
FIG. 20B is a diagram showing an example of another weighting.

FIGS. 20A and 20B are diagrams showing values before weighting and values after weighting in accordance with other examples of the weighting coefficients described above.

For example, with respect to a demodulated value of a positive/negative multi-valued output in a soft decision output type shown in FIG. 20A, the weighting coefficient generator 1302 may calculate the weighting coefficients such that weighting coefficients of specific subcarriers are determined as a predetermined value $\alpha$ (where $0 \leq \alpha < 1$) and weighting coefficients of the other subcarriers are determined as 1.

The weighting calculator 1304 converts the absolute value of a demodulated value of a specific subcarrier into a value closer to zero by multiplying the demodulated value by a predetermined value α for the specific subcarrier, thereby reducing the reliability.

Additionally, in the case of a demodulated value of a positive number multi-valued output in the soft decision output type, a bit value is decoded as "−1" when the demodulated value is close to 0, and the bit value is decoded as "1" when the demodulated value is close to a maximum value. In such a case, the weighting coefficient generator 1302 may calculate a weighting coefficient for replacing a demodulated value of a specific subcarrier with a median of the values of output candidates (e.g., a median 3 or 4 when the values of the output candidates are 0 to 7).

Moreover, in the case of a hard decision output type as shown in FIG. 20B, i.e., a type of outputting a binary value of "−1" or "+1", the weighting coefficient generator 1302 may output a coefficient for replacing a binary demodulated value with "0" to the weighting calculator 1304 as a weighting coefficient for a specific subcarrier.

In this way, in the case of a communication scheme which employs an error correction code such as block coding and which is capable of acquiring a signal of a desired wave based on demodulated values of other subcarriers even when demodulated values or the like of part of subcarriers are missing, it is possible to improve the reception error correction performance by performing weighting calculation processing on a demodulated value using a weighting coefficient for reducing the reliability with respect to a subcarrier having low reliability which may cause an error.

Subsequently, a receiving device that filters an interference region will be described below.

Figure 21:
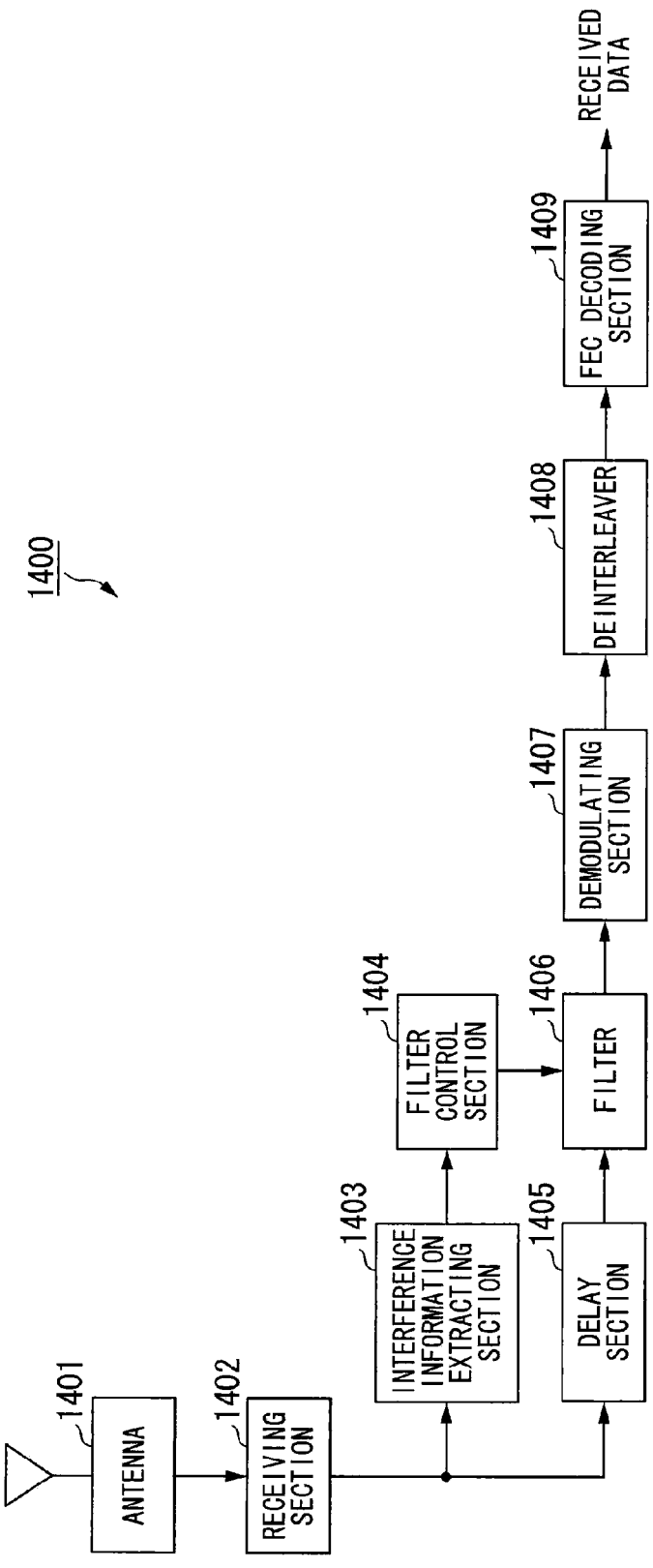
FIG. 21 is a block diagram showing a functional configuration of a receiving device that performs filtering.

FIG. 21 is a block diagram showing a functional configuration of a signal receiving device 1400. As shown in the figure, the signal receiving device 1400 is provided with an antenna 1401, a receiving section 1402, an interference information extracting section 1403, a filter control section 1404, a delay section 1405, a filter 1406, a demodulating section 1407, a deinterleaver 1408, and an FEC decoding section 1409.

The antenna 1401 receives a signal in which a desired signal and an interference signal are combined.

The receiving section 1402 down-converts the received signal and then performs analog/digital conversion.

The interference information extracting section 1403 performs interference information extraction processing of extracting interference information including a center frequency of an interference signal and a frequency bandwidth of the interference signal from the received signal based on desired signal information determined at the initiation of communication with the signal transmitting device.

The interference information extraction processing can be realized by the existing technology. For example, the interference information extracting section 1403 calculates a frequency spectrum of the received signal by performing a fast Fourier transform (FFT) on the received signal, estimates a frequency spectrum of the interference signal by calculating the difference between the calculated frequency spectrum of the received signal and the estimated result of a frequency spectrum of a desired signal obtained based on the desired signal information, and extracts the interference information based on a result of this estimation.

The filter control section 1404 stores the desired signal information at the initiation of communication with the signal transmitting device, determines filter parameters satisfying the following two conditions based on the desired signal information and the interference information extracted by the interference information extracting section 1403, and sets the determined parameters in the filter 1406.

(1) A received signal in a frequency band in which no interference signal is present and only a desired signal is present is passed.

(2) A received signal in a frequency band in which an interference signal is present is attenuated.

It is noted that the filter parameters are configured by, for example, a filter type and a cutoff frequency.

The delay section 1405 applies, to the received signal, a time delay corresponding to a time required for the interference information extracting section 1403 and the filter control section 1404 to complete their processing after the receiving section 1402 has completed its processing, and outputs the delayed received signal to the filter 1406. A delay amount applied to the received signal by the delay section 1405 is preset by a designer.

The filter 1406 filters the received signal to which the delay is applied by the delay section 1405 based on a filter of which parameters are set by the filter control section 1404. That is, the filter 1406 filters the received signal, which is referred to by the filter control section 1404 upon determination of the parameters, based on the filter of which parameters are set by the filter control section 1404.

The demodulating section 1407 generates a demodulated signal by removing a guard interval from the received signal filtered by the filter 1406 and performing FFT and demodulation.

The deinterleaver 1408 deinterleaves the demodulated signal generated by the demodulating section 1407.

The FEC decoding section 1409 decodes the demodulated signal deinterleaved by the deinterleaver 1408 in accordance with FEC, generates a bit sequence in which an error bit has been corrected, and outputs received data.

Figure 22:
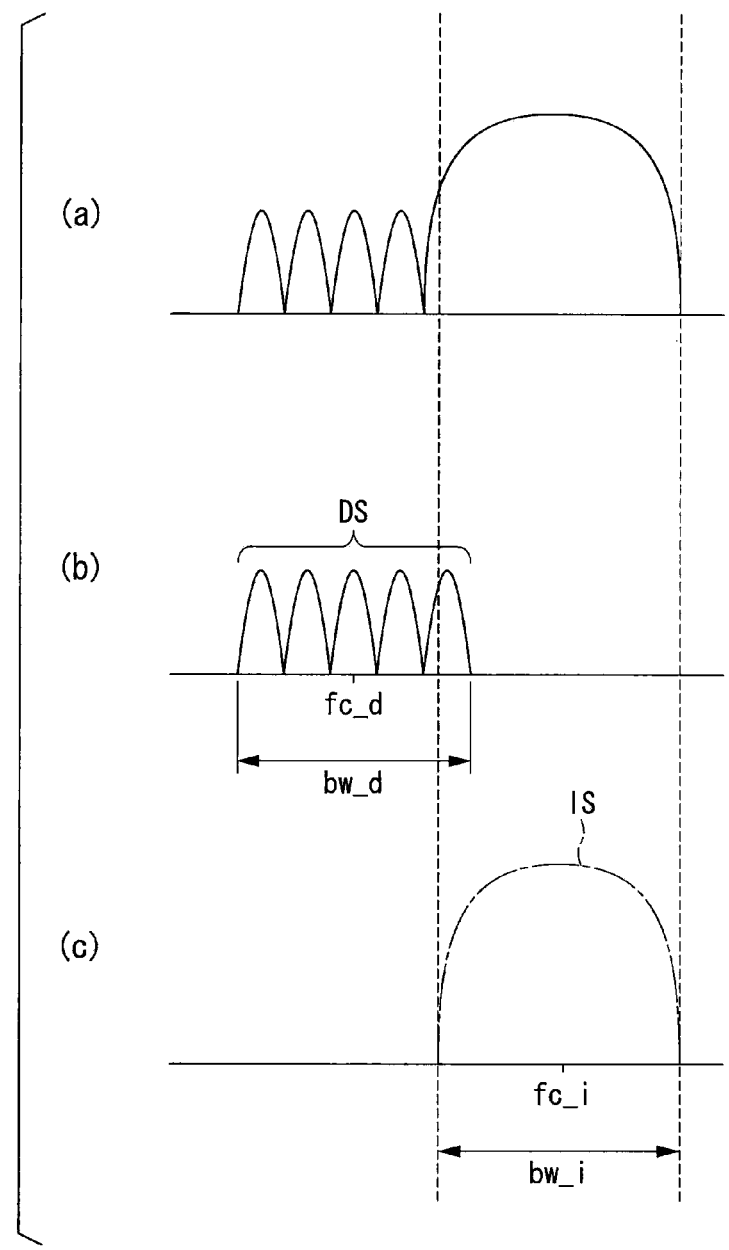
FIG. 22 is a conceptual diagram showing frequency spectra of a received signal, a desired signal, and an interference signal.

FIG. 22 is a conceptual diagram showing frequency spectra of a received signal, a desired signal, and an interference signal. In FIG. 22, the vertical axis represents power and the horizontal axis represents frequency. FIG. 22(*a*) is a conceptual diagram showing the frequency spectrum of a signal received by the antenna 1401. FIG. 22(*b*) is a conceptual diagram showing the frequency spectrum of the desired signal included in the received signal of FIG. 22(*a*). In FIG. 22(*b*), a reference symbol DS denotes the frequency spectrum of the desired signal, fc_d denotes a center frequency of the desired signal, and bw_d denotes the frequency bandwidth of the desired signal. FIG. 22(*c*) is a conceptual diagram showing the frequency spectrum of the interference signal included in the received signal of FIG. 22(*a*). In FIG. 22(*c*), a reference symbol IS denotes the frequency spectrum of the interference signal, fc_i denotes a center frequency of the interference signal, and bw_i denotes the frequency bandwidth of the interference signal.

Subsequently, the details of an operation of the filter control section 1404 will be described. The filter control section 1404 calculates a relative position between a desired signal and an interference signal based on desired signal information and interference information, and determines filter parameters to be applied to the filter 1406 in accordance with the calculated result. Specifically, the filter control section 1404 selects a filter type to be applied to the filter 1406 from among a high-pass filter, a low-pass filter, and a notch filter based on the desired signal information and the interference information. Moreover, the filter control section 1404 determines a cutoff frequency of the filter. The filter control section 1404 then controls the filter 1406 in accordance with the determined filter type and cutoff frequency.

Figure 23:
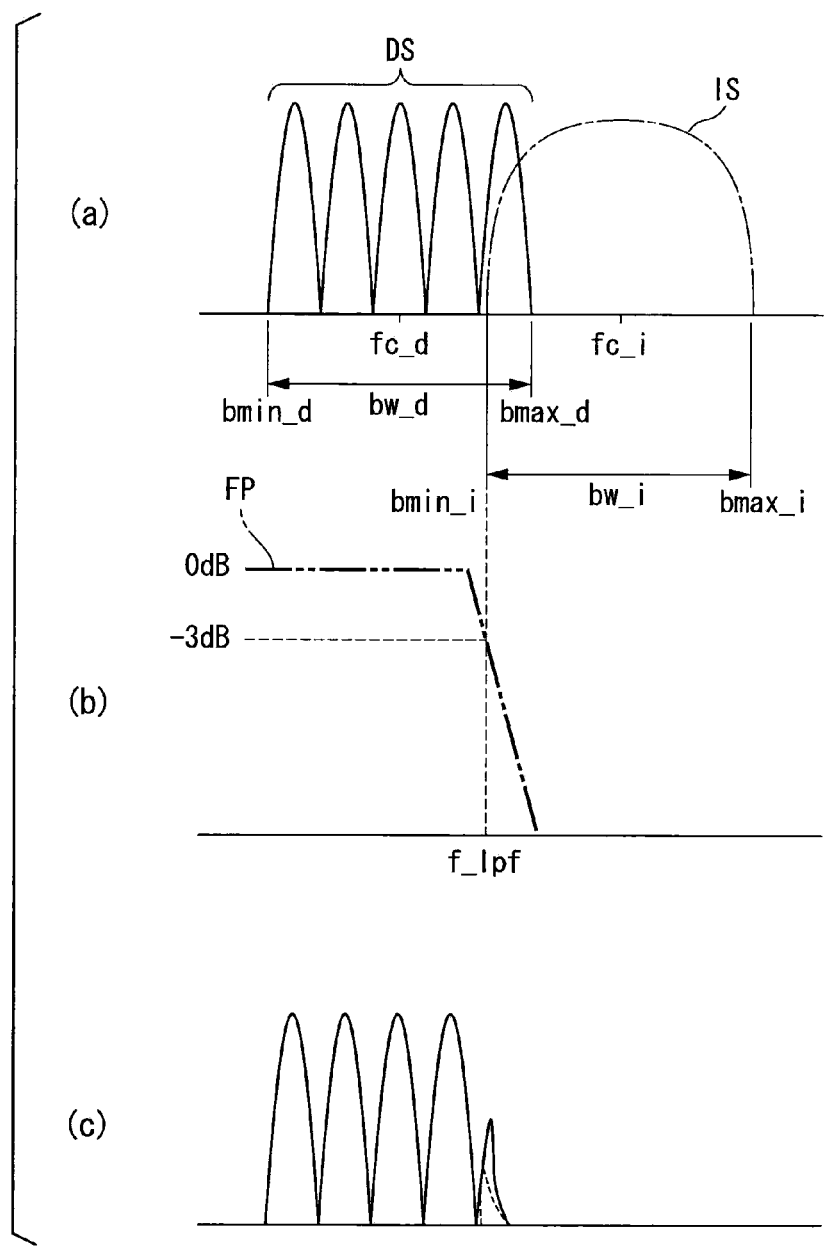
FIG. 23 is a schematic diagram showing an overview of filter control processing, which is performed by a filter control section shown in FIG. 21.
Figure 24:
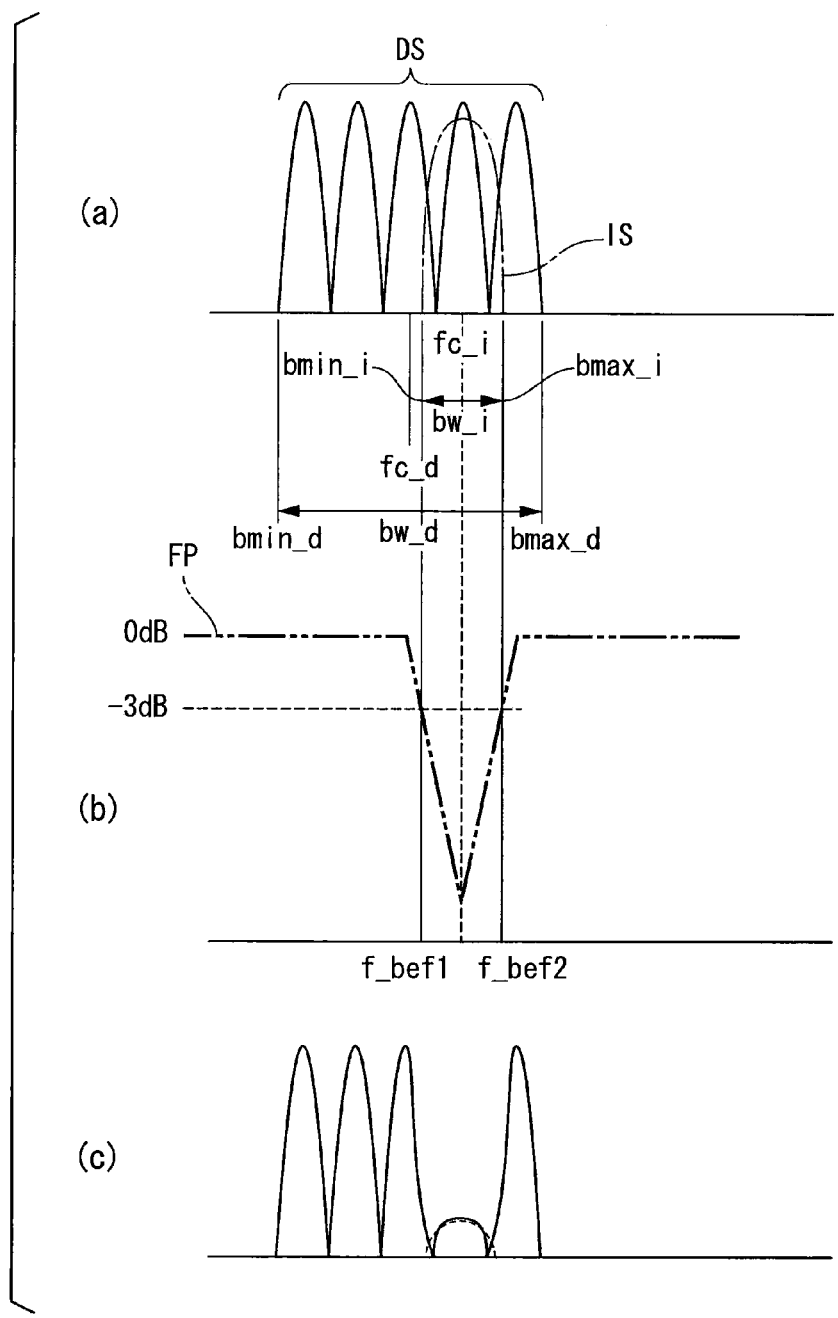
FIG. 24 is a schematic diagram showing an overview of filter control processing, which is performed by the filter control section shown in FIG. 21.
Figure 25:
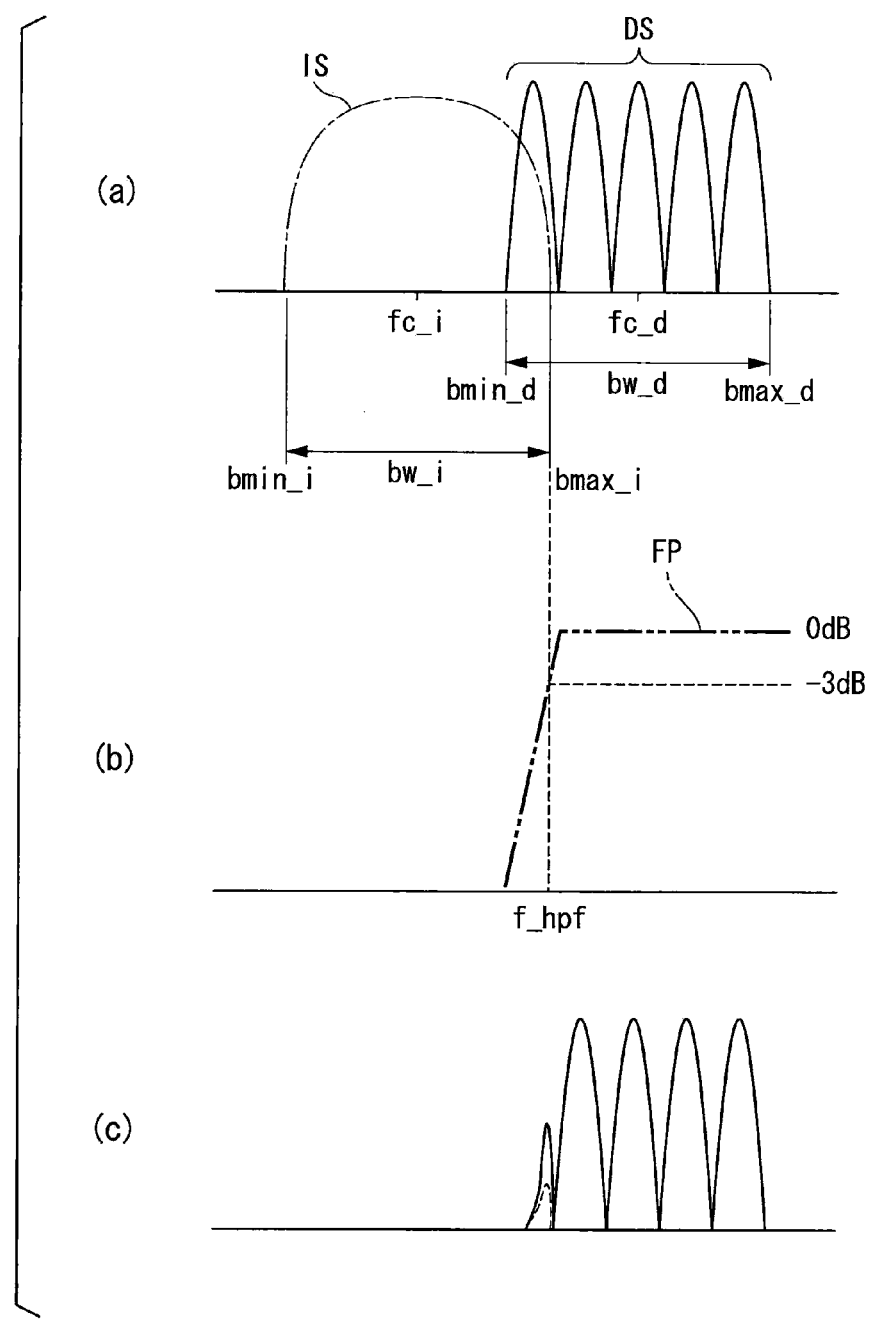
FIG. 25 is a schematic diagram showing an overview of filter control processing, which is performed by the filter control section shown in FIG. 21.

FIGS. 23 to 25 are schematic diagrams showing an overview of filter control processing performed by the filter control section 1404. Hereinafter, the details of the filter control processing will be described with reference to FIGS. 23 to 25.

FIG. 23 is a schematic diagram showing an overview of the filter control processing when the filter control section 1404 sets a low-pass filter in the filter 1406. FIG. 23(a) is a schematic diagram showing a frequency spectrum of a signal received by the antenna 1401 divided into a frequency spectrum of a desired signal and a spectrum of an interference signal. In FIG. 23(a), the vertical axis represents power, the horizontal axis represents frequency, a reference symbol DS denotes the frequency spectrum of the desired signal, and a reference symbol IS denotes the frequency spectrum of the interference signal. The filter control section 1404 calculates a maximum value (bmax_i) of a frequency band of the interference signal based on a center frequency (fc_i) and a frequency bandwidth (bw_i) of the interference signal, calculates a maximum value (bmax_d) of a frequency band of the desired signal based on a center frequency (fc_d) and a frequency bandwidth (bw_d) of the desired signal, and applies the low-pass filter to the filter 1406 if bmax_i is higher than bmax_d (FIG. 23(a)).

FIG. 23(b) is a schematic diagram showing an overview of the low-pass filter applied to the filter 1406 by the filter control section 1404. In FIG. 23(b), the vertical axis represents gain (in units of dB) and the horizontal axis represents frequency (in units of Hz). In this case, the filter control section 1404 calculates a minimum value (bmin_i) of the frequency band of the interference signal based on the center frequency (fc_i) and the frequency bandwidth (bw_i) of the interference signal, and determines the value of a cutoff frequency (a frequency at which a gain of the low-pass filter becomes −3 dB) f_lpf of the low-pass filter as bmin_i. The filter control section 1404 then sets parameters in which the filter type is the low-pass filter and the cutoff frequency f_lpf is bmin_i, as indicated by a reference symbol FP, in the filter 1406.

FIG. 23(c) is a schematic diagram showing a frequency spectrum after a received signal shown in FIG. 23(a) is filtered by the filter 1406 in which the low-pass filter shown in FIG. 23(b) is set. As shown in the figure, the filter 1406 attenuates the power of a signal having a frequency that is higher than the minimum value (bmin_i) of the frequency band of the interference signal, regardless of whether the signal is a desired signal or an interference signal.

FIG. 24 is a schematic diagram showing an overview of the filter control processing when the filter control section 1404 sets a notch filter in the filter 1406. FIG. 24(a) is a schematic diagram showing a frequency spectrum of a signal received by the antenna 1401 divided into a frequency spectrum of a desired signal and a spectrum of an interference signal. In FIG. 24(a), the vertical axis represents power, the horizontal axis represents frequency, a reference symbol DS denotes the frequency spectrum of the desired signal, and a reference symbol IS denotes the frequency spectrum of the interference signal. The filter control section 1404 calculates a maximum value (bmax_i) and a minimum value (bmin_i) of a frequency band of the interference signal based on a center frequency (fc_i) and a frequency bandwidth (bw_i) of the interference signal, calculates a maximum value (bmax_d) and a minimum value (bmin_d) of a frequency band of the desired signal based on a center frequency (fc_d) and a frequency bandwidth (bw_d) of the desired signal, and applies the notch filter to the filter 1406 if bmax_i is lower than bmax_d and bmin_i is higher than bmin_d (FIG. 24(a)).

FIG. 24(b) is a schematic diagram showing an overview of the notch filter to be applied to the filter 1406 by the filter control section 1404. In FIG. 24(b), the vertical axis represents gain (in units of dB) and the horizontal axis represents frequency (in units of Hz). In this case, the filter control section 1404 calculates a minimum value (bmin_i) and a maximum value (bmax_i) of a frequency band of the interference signal based on a center frequency (fc_i) and a frequency bandwidth (bw_i) of the interference signal, and determines the values of two cutoff frequencies (two frequencies at which a gain of the notch filter becomes −3 dB) f_bef1 and f_bef2 of the notch filter as bmin_i and bmax_i. The filter control section 1404 then sets parameters in which the filter type is the notch filter and the two cutoff frequencies f_bef1 and f_bef2 are bmin_i and bmax_i, as indicated by a reference symbol FP, in the filter 1406.

FIG. 24(c) is a schematic diagram showing a frequency spectrum after the received signal shown in FIG. 24(a) is filtered by the filter 1406 in which the notch filter shown in FIG. 24(b) is set. As shown in the figure, the filter 1406 attenuates the power of a signal having a frequency between the minimum value (bmin_i) and the maximum value (bmax_i) of the frequency band of the interference signal, regardless of whether the signal is a desired signal or an interference signal.

FIG. 25 is a schematic diagram showing an overview of the filter control processing when the filter control section 1404 sets a high-pass filter in the filter 1406. FIG. 25(a) is a schematic diagram showing a frequency spectrum of a signal received by the antenna 1401 divided into a frequency spectrum of a desired signal and a spectrum of an interference signal. In FIG. 25(a), the vertical axis represents power, the horizontal axis represents frequency, a reference symbol DS denotes the frequency spectrum of the desired signal, and a reference symbol IS denotes the frequency spectrum of the interference signal. The filter control section 1404 calculates a minimum value (bmin_i) of a frequency band of the interference signal based on a center frequency (fc_i) and a frequency bandwidth (bw_i) of the interference signal, calculates a minimum value (bmin_d) of a frequency band of the desired signal based on a center frequency (fc_d) and a frequency bandwidth (bw_d) of the desired signal, and applies the high-pass filter to the filter 1406 if bmin_i is lower than bmin_d (FIG. 25(a)).

FIG. 25(b) is a schematic diagram showing an overview of the high-pass filter applied to the filter 1406 by the filter control section 1404. In FIG. 25(b), the vertical axis represents gain (in units of dB) and the horizontal axis represents frequency (in units of Hz). In this case, the filter control section 1404 calculates a maximum value (bmax_i) of a frequency band of the interference signal based on a center frequency (fc_i) and a frequency bandwidth (bw_i) of the interference signal, and determines the value of a cutoff frequency (a frequency at which a gain of the high-pass filter becomes −3 dB) f_hpf of the high-pass filter as bmax_i. The filter control section 1404 then sets parameters in which the filter type is the high-pass filter and the cutoff frequency f_hpf is bmax_i, as indicated by a reference symbol FP, in the filter 1406.

FIG. 25(c) is a schematic diagram showing a frequency spectrum after the received signal shown in FIG. 25(a) is filtered by the filter 1406 in which the high-pass filter shown in FIG. 25(b) is set. As shown in the figure, the filter 1406 attenuates the power of a signal having a frequency that is lower than the maximum value (bmax_i) of the frequency band of the interference signal, regardless of whether the signal is a desired signal or an interference signal.

Subsequently, an operation and a processing procedure of the signal receiving device 1400 will be described.

Figure 26:
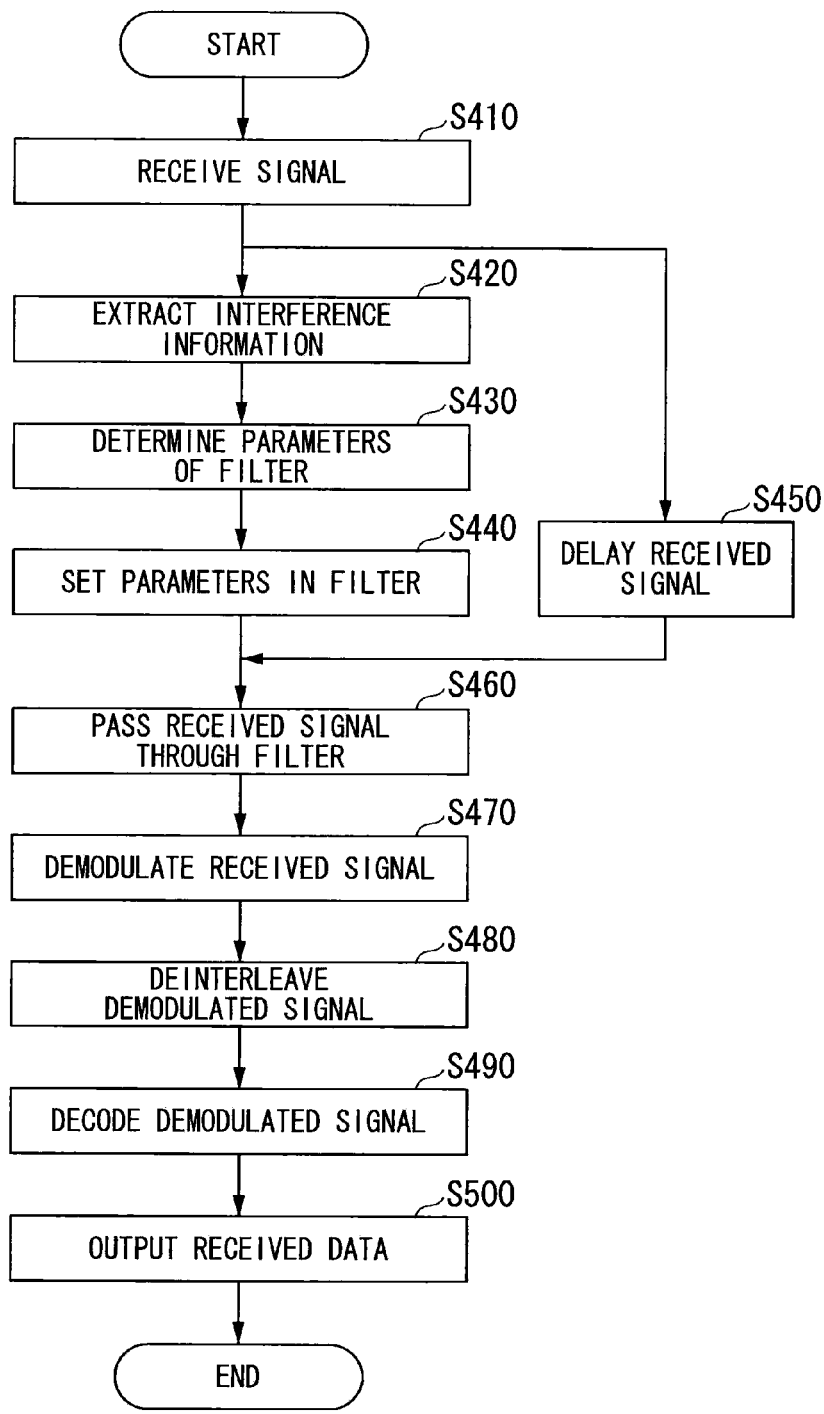
FIG. 26 is a flowchart showing a filter control procedure of the signal receiving device shown in FIG. 21.
Figure 27:
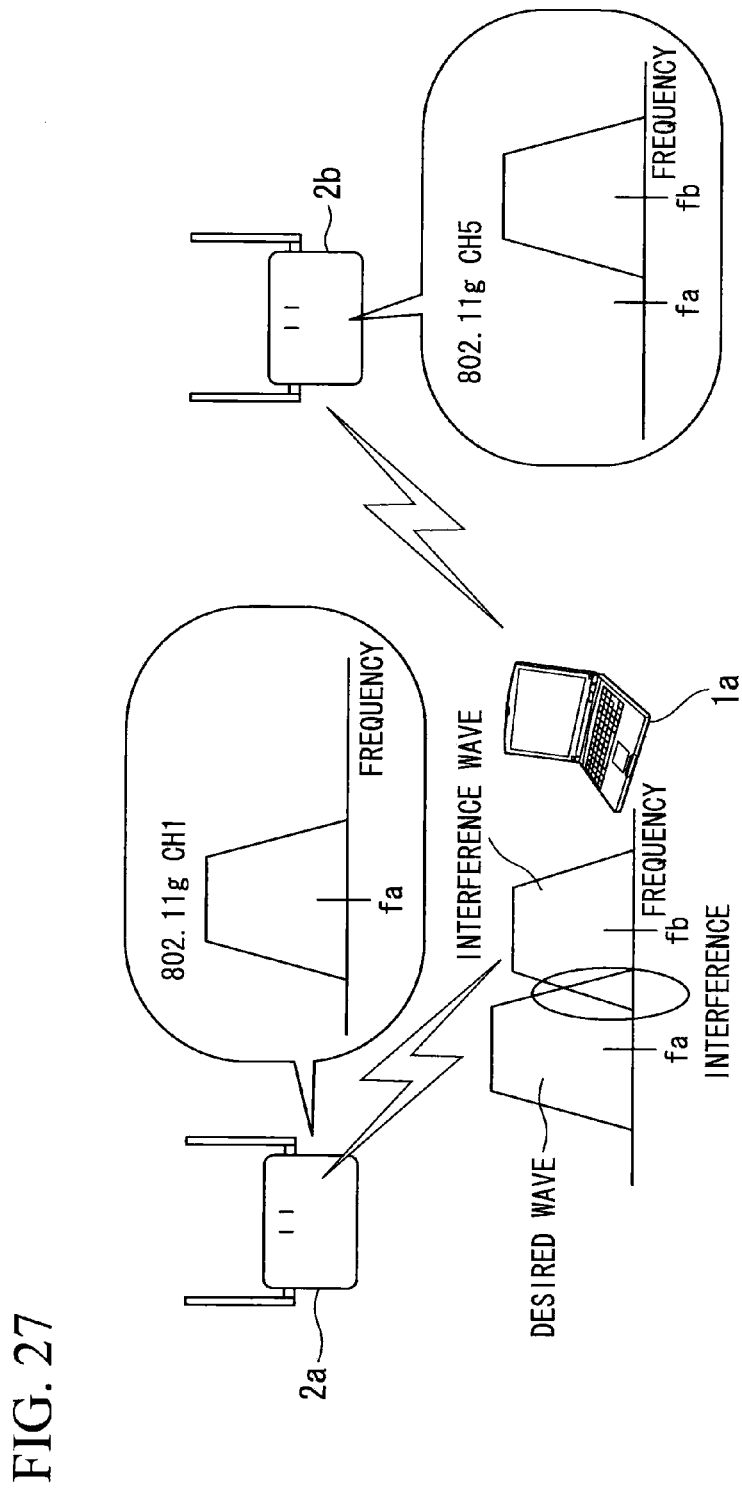
FIG. 27 is a diagram showing interference in two wireless communication systems having different frequency channels.

FIG. 26 is a flowchart showing the processing procedure when the signal receiving device 1400 controls a filter.

First, as shown in FIG. 26, the antenna 1401 receives a signal, and the receiving section 1402 performs a down-conversion and an analog/digital conversion on the received signal (step S410). The interference information extracting section 1403 then extracts interference information from the received signal processed by the receiving section 1402 (step S420). Subsequently, the filter control section 1404 determines a filter type to be applied to the filter 1406 and a cutoff frequency of a filter as described above based on the interference information extracted by the interference information extracting section 1403 and desired signal information stored in the filter control section 1404 (step S430). The filter control section 1404 then sets the determined filter type and the determined cutoff frequency of the filter in the filter 1406 (step S440).

In parallel with the processing of steps S420 to S440, the delay section 1405 delays the received signal (step S450). Subsequently, the filter 1406 forms a filter in accordance with the parameters set in the processing of step S440, and attenuates the power of a frequency band in which an interference signal is present in the received signal by filtering the delayed received signal (step S460). The demodulating section 1407 then demodulates the received signal that has passed the filter 1406 to generate a demodulated signal (step S470). The deinterleaver 1408 then deinterleaves the demodulated signal (step S480). The FEC decoding section 1409 then performs FEC-decoding on the deinterleaved demodulated signal (step S490), outputs decoded received data (step S500), and ends the processing of the whole flowchart.

In this way, in the signal receiving device 1400, the interference information extracting section 1403 extracts interference information and the filter control section 1404 sets parameters of a filter for attenuating a signal in a frequency band in which an interference signal is present in the filter 1406. The filter 1406 then filters the received signal to attenuate the signal in the frequency band in which the interference signal is present among signals included in the received signal. Thus, it is possible to mitigate the influence by the interference signal in the received signal.

The embodiments of the present invention have been described above, but the present invention is not limited to the above-described embodiments. Addition, omission, replacement and other modifications can be made to the configuration without departing from the gist of the present invention. The present invention is not limited by the above description, and is limited only by the accompanying claims thereof.

INDUSTRIAL APPLICABILITY

The present invention can be used in, for example, communication of a multicarrier signal using a spectrum including a plurality of subcarriers. In accordance with the present invention, it is possible to improve the frequency utilization efficiency of a used frequency band used in transmission of a multicarrier signal.

Description of Reference Symbols
100: Communication system
110: Base station device
111: Transmitting section
112: Receiving section
113: Control section
114: Antenna
111*a*: Transmission baseband signal generator
111*b*: Up-converter device
112*a*: Interference wave detecting device
113*a*: Frequency allocating device
113*b*: Frequency changing device
113*c*: Bandwidth changing device
120: Terminal station device
121: Transmitting section
122: Receiving section
123: Control section
124: Antenna
1100: Signal transmitting device
1110: Variable superposed rate scheduler
1111: Serial/parallel converter
1112: Block superposed rate decider
1113: Modulation and coding level determiner
1114-1 to 1114-*n*: Coder/modulator
1115: Subcarrier allocator
1120: OFDM modulator
1130: Parallel/serial converter
1140: Storage section
1300: Signal receiving device
1301: Interference band detector
1302: Weighting coefficient generator
1303: Demodulator
1304: Weighting calculator
1305: Decoder
1400: Signal receiving device
1401: Antenna
1402: Receiving section
1403: Interference information extracting section
1404: Filter control section
1405: Delay section
1406: Filter
1407: Demodulating section
1408: Deinterleaver
1409: FEC decoding section

The invention claimed is:

1. A communication method in a communication system configured by a transmitting station device and a receiving station device for transmitting and receiving a multicarrier signal using a spectrum including a plurality of subcarriers, the communication method comprising: a control step of setting a superposed rate which is a rate in which a superposed band in which interference is occurring is used in a used frequency band used for transmitting the multicarrier signal so as to increase frequency utilization efficiency of the used frequency band; and a transmitting step of transmitting the multicarrier signal using a spectrum allocated in accordance with the set superposed rate,
wherein an allocation target of data to be transmitted is the entirety of the superposed band and a non-superposed band in the used frequency band and,
wherein the communication method is a communication method when three or more communication systems simultaneously perform communication, and the control step further comprises: a spectrum arranging step of deriving the superposed rate from a bandwidth of each spectrum and a predetermined superposed bandwidth in which each spectrum is superposed on another spectrum and of arranging each spectrum so that the superposed rate of each spectrum is the same; and a spectrum allocating step of allocating the spectrum arranged in its own communication system.

2. A communication method in a communication system configured by a transmitting station device and a receiving station device for transmitting and receiving a multicarrier signal using a spectrum including a plurality of subcarriers, the communication method comprising:

a control step of setting a superposed rate which is a rate in which a superposed band in which interference is occurring is used in a used frequency band used for transmitting the multicarrier signal so as to increase frequency utilization efficiency of the used frequency band; and a transmitting step of transmitting the multicarrier signal using a spectrum allocated in accordance with the set superposed rate, wherein the communication method is a communication method when three or more communication systems simultaneously perform communication, the communication method further comprises:

a superposed band recognizing step of pre-recognizing, by the receiving station device, the superposed band with another communication system in the spectrum arranged in its own communication system;

an interference suppressing step of applying, by the receiving station device, interference suppressing technology to the superposed band; and an error-correction decoding step of receiving, by the receiving station device, the multicarrier signal addressed to its own receiving station device by error-correction decoding a signal to which the interference suppressing technology is applied, the control step further comprises:

a spectrum arranging step of deriving the superposed rate from a bandwidth of each spectrum and a predetermined superposed bandwidth in which each spectrum is superposed on another spectrum and of arranging each spectrum so that the superposed rate of each spectrum is the same; and a spectrum allocating step of allocating the spectrum arranged in its own communication system, and in the transmitting step, the transmitting station device transmits the multicarrier signal using the spectrum allocated to its own communication system.

3. The communication method according to claim 2, wherein the interference suppressing step performs interference suppression by attenuating a received signal in the recognized superposed band using a frequency filter.

4. The communication method according to claim 2, wherein the interference suppressing step masks a likelihood of a received signal of the recognized superposed band, and the error-correction decoding step receives the multicarrier signal addressed to its own receiving station device by error-correction decoding the received signal in which the likelihood is masked.

5. The communication method according to claim 2, wherein the spectrum arranging step arranges the spectrum based on a result detected by an interference signal detecting section provided in the receiving station device.

6. The communication method according to claim 2, wherein the spectrum arranging step arranges the spectrum based on a result detected by an interference signal detecting section provided in the transmitting station device.

7. The communication method according to claim 2, wherein the spectrum arranging step arranges the spectrum based on a result detected by an interference signal detecting section provided in a control station device which is different from either of the transmitting station device and the receiving station device.

8. The communication method according to claim 2, wherein the bandwidth of the spectrum is variable for each communication system, and in the spectrum arranging step, two spectra having a narrower bandwidth than other spectra among spectra are arranged at ends of the used frequency band, and each spectrum is arranged so that the superposed rate of each spectrum is the same.

9. The communication method according to claim 8, wherein the interference suppressing step performs interference suppression by attenuating a received signal in the recognized superposed band using a frequency filter.

10. The communication method according to claim 8, wherein the interference suppressing step masks a likelihood of a received signal of the recognized superposed band, and the error-correction decoding step receives the multicarrier signal addressed to its own receiving station device by error-correction decoding the received signal in which the likelihood is masked.

11. The communication method according to claim 8, wherein the spectrum arranging step arranges the spectrum based on a result detected by an interference signal detecting section provided in the receiving station device.

12. The communication method according to claim 8, wherein the spectrum arranging step arranges the spectrum based on a result detected by an interference signal detecting section provided in the transmitting station device.

13. The communication method according to claim 8, wherein the spectrum arranging step arranges the spectrum based on a result detected by an interference signal detecting section provided in a control station device which is different from either of the transmitting station device and the receiving station device.

14. A communication method in a communication system configured by a transmitting station device and a receiving station device for transmitting and receiving a multicarrier signal using a spectrum including a plurality of subcarriers, the communication method comprising:

a control step of setting a superposed rate which is a rate in which a superposed band in which interference is occurring is used in a used frequency band used for transmitting the multicarrier signal so as to increase frequency utilization efficiency of the used frequency band;

a transmitting step of transmitting the multicarrier signal using a spectrum allocated in accordance with the set superposed rate;

a coding and modulating step of coding and modulating data of a user;

a superposed rate deciding step of setting a superposed rate which is a rate of an interference band in a frequency band used in transmission of the data of the user to be lower than a superposed rate which is a rate of an interference band in a frequency band used by the multicarrier signal if a service quality requirement of the user is higher than a predetermined service quality;

a subcarrier allocating step of allocating the data of the user coded and modulated in the coding and modulating step to subcarriers in a non-interference band and an interference band in accordance with the superposed rate set in the superposed rate deciding step;

a multicarrier modulating step of modulating the data of the user coded and modulated in the coding and modulating step into the subcarriers allocated in the subcarrier allocating step; and a parallel/serial conversing step of generating the multicarrier signal by performing serial conversion on the subcarriers modulated in the multicarrier modulating step.

15. The communication method according to claim 14, wherein:

in the coding and modulating step, data of a plurality of different users is coded and modulated, in the superposed rate deciding step, for each of the users, a superposed rate of each user is set to be lower than the superposed rate which is the rate of the interference band in the frequency band used by the multicarrier signal, if the service quality requirement of each user is higher than the predetermined service quality, and the superposed rate of each user is set to be higher than the superposed rate which is the rate of the interference band in the frequency band used by the multicarrier signal, if the service quality requirement of each user is lower than the predetermined service quality, in order that an average superposed rate of all the users is equal to the superposed rate which is the rate of the interference band in the frequency band used by the multicarrier signal, in the subcarrier allocating step, for each user, the data of each user coded and modulated in the coding and modulating step is allocated to the subcarriers in the non-interference and the interference band in accordance with the superposed rate of each user set in the superposed rate deciding step, and in the multicarrier modulating step, for each user, the data of each user coded and modulated in the coding and modulating step is modulated into the subcarriers allocated to the data of each user in the subcarrier allocating step.

16. A control station device for determining an arrangement of a spectrum when three or more communication systems respectively configured by a transmitting station device and a receiving station device for transmitting and receiving a multicarrier signal using a spectrum including a plurality of subcarriers simultaneously perform communication, the control station device comprising:

an interference signal detecting section which detects an interference signal in a superposed band with another communication system in the spectrum;

a spectrum arranging section which derives a superposed rate from a bandwidth of each spectrum and a predetermined superposed bandwidth in which each spectrum is superposed on another spectrum and which arranges each spectrum so that the superposed rate of each spectrum is the same;

a spectrum allocating section which allocates a spectrum arranged in a communication system in which the transmitting station device, which transmits the multicarrier signal using the allocated spectrum, communicates with the receiving station device, which receives a multicarrier signal addressed to its own receiving station device by recognizing the superposed band with the other communication system in the arranged spectrum, by applying interference suppressing technology to the superposed band, and by error-correction decoding a signal to which the interference suppressing technology is applied; and a control information distributing section which reports the allocated spectrum to the transmitting station device of its own communication system and another communication system.

17. A transmitting station device in a communication system configured by the transmitting station device and a receiving station device for transmitting and receiving a multicarrier signal using a spectrum including a plurality of subcarriers, the transmitting station device comprising: a control section which sets a superposed rate which is a rate in which a superposed band in which interference is occurring is used in a used frequency band used for transmitting the multicarrier signal so as to increase frequency utilization efficiency of the used frequency band; and a transmitting section which transmits the multicarrier signal using a spectrum allocated in accordance with the set superposed rate, wherein an allocation target of data to be transmitted is the entirety of the superposed band and a non-superposed band in the used frequency band and, wherein three or more communication systems simultaneously perform communication, and the control section further comprises: a spectrum arranging section which derives the superposed rate from a bandwidth of each spectrum and a predetermined superposed bandwidth in which each spectrum is superposed on another spectrum, and arranges each spectrum so that the superposed rate of each spectrum is the same; and a spectrum allocating section which allocates the spectrum arranged in its own communication system.

18. The transmitting station device according to claim 17, comprising an interference signal detecting section which detects an interference signal in the superposed band with another communication system in the spectrum so as to arrange the spectrum.

19. A transmitting station device in a communication system configured by the transmitting station device and a receiving station device for transmitting and receiving a multicarrier signal using a spectrum including a plurality of subcarriers, the transmitting station device comprising:

a control section which sets a superposed rate which is a rate in which a superposed band in which interference is occurring is used in a used frequency band used for transmitting the multicarrier signal so as to increase frequency utilization efficiency of the used frequency band;

a transmitting section which transmits the multicarrier signal using a spectrum allocated in accordance with the set superposed rate;

a coding and modulating section which codes and modulates data of a user;

a superposed rate deciding section which sets a superposed rate which is a rate of an interference band in a frequency band used in transmission of the data of the user to be lower than a superposed rate which is a rate of an interference band in a frequency band used by the multicarrier signal if a service quality requirement of the user is higher than a predetermined service quality;

a subcarrier allocating section which allocates the data of the user coded and modulated by the coding and modulating section to subcarriers in a non-interference band and an interference band in accordance with the superposed rate set by the superposed rate deciding section;

a multicarrier modulating section which modulates the data of the user coded and modulated by the coding and modulating section into the subcarriers allocated by the subcarrier allocating section; and a parallel/serial converting section which generates the multicarrier signal by performing serial conversion on the subcarriers modulated by the multicarrier modulating section.

20. The transmitting station device according to claim 19, comprising a plurality of coding and modulating sections, wherein the plurality of coding and modulating sections respectively code and modulate data of different users, the superposed rate deciding section sets, for each of the users, a superposed rate of each user to be lower than the superposed rate which is the rate of the interference band in the frequency band used by the multicarrier signal, if a service quality requirement of each user is higher than the predetermined service quality, and sets, for each user, the superposed rate of each user to be higher than the superposed rate which is the rate of the interference band in the frequency band used by the multicarrier signal, if the service quality requirement of each user is lower than the predetermined service quality in order that an average superposed rate of all the users is equal to the superposed rate which is the rate of the interference band in the frequency band used by the multicarrier signal, the subcarrier allocating section allocates, for each user, the data of the user coded and modulated by the coding and modulating section to the subcarriers in the non-interference band and the interference band in accordance with the superposed rate of each user set by the superposed rate deciding section, and the multicarrier modulating section modulates, for each user, the data of each user coded and modulated by the coding and modulating section into the subcarriers allocated to the data of each user by the subcarrier allocating section.

21. The transmitting station device according to claim 19, further comprising a modulation and coding level determining section which determines a modulation and coding level based on the superposed rate set by the superposed rate deciding section, wherein the coding and modulating section codes and modulates the data of the user in accordance with the modulation and coding level determined by the modulation and coding level determining section.

22. The transmitting station device according to claim 20, wherein the superposed rate deciding section sets the superposed rate of the user to be increased if reception quality of the data of the user is higher than a predetermined threshold, and sets the superposed rate of the user to be lowered if the reception quality of the data of the user is lower than the predetermined threshold.

23. The transmitting station device according to claim 20, further comprising a modulation and coding level determining section which determines a modulation and coding level based on the superposed rate set by the superposed rate deciding section, wherein the coding and modulating section codes and modulates the data of the user in accordance with the modulation and coding level determined by the modulation and coding level determining section.

24. The transmitting station device according to claim 22, further comprising a modulation and coding level determining section which determines a modulation and coding level based on the superposed rate set by the superposed rate deciding section, wherein the coding and modulating section codes and modulates the data of the user in accordance with the modulation and coding level determined by the modulation and coding level determining section.

25. A communication system for determining an arrangement of a spectrum when three or more communication systems respectively configured by a transmitting station device and a receiving station device for transmitting and receiving a multicarrier signal using a spectrum including a plurality of subcarriers simultaneously perform communication, the communication system comprising:

a spectrum arranging section which derives a superposed rate from a bandwidth of each spectrum and a predetermined superposed bandwidth in which each spectrum is superposed on another spectrum and which arranges each spectrum so that the superposed rate of each spectrum is the same;

a spectrum allocating section which allocates the arranged spectrum;

a transmitting section which transmits the multicarrier signal using the allocated spectrum; and a receiving section which receives the multicarrier signal addressed to its own receiving section by recognizing a superposed band with another communication system in the allocated spectrum, by applying interference suppressing technology to the superposed band, and by error-correction decoding a signal to which the interference suppressing technology is applied.

* * * * *